(12) United States Patent
Larsson

(10) Patent No.: US 10,666,033 B2
(45) Date of Patent: May 26, 2020

(54) MODULAR STACKABLE ENCLOSURE SYSTEM

(71) Applicant: Communications Systems, Inc., Minnetonka, MN (US)

(72) Inventor: Nicholas B. Larsson, Blomkest, MN (US)

(73) Assignee: Suttle, Inc., Minnetonka, MN (US)

( * ) Notice: Subject to any disclaimer, the term of this patent is extended or adjusted under 35 U.S.C. 154(b) by 269 days.

(21) Appl. No.: 15/591,637

(22) Filed: May 10, 2017

(65) Prior Publication Data

US 2017/0332498 A1   Nov. 16, 2017

Related U.S. Application Data

(60) Provisional application No. 62/334,552, filed on May 11, 2016.

(51) Int. Cl.
| | |
|---|---|
| *H03G 3/10* | (2006.01) |
| *H02G 3/14* | (2006.01) |
| *H02G 3/08* | (2006.01) |
| *H02G 3/10* | (2006.01) |
| *H02G 3/12* | (2006.01) |

(52) U.S. Cl.
CPC ............ *H02G 3/14* (2013.01); *H02G 3/083* (2013.01); *H02G 3/086* (2013.01); *H02G 3/088* (2013.01); *H02G 3/10* (2013.01); *H02G 3/12* (2013.01)

(58) Field of Classification Search
CPC ................................. H02G 3/10; H05K 5/03
See application file for complete search history.

(56) References Cited

U.S. PATENT DOCUMENTS

| | | | | |
|---|---|---|---|---|
| 4,575,169 A | * | 3/1986 | Duplatre | H01R 9/2441 |
| | | | | 174/665 |
| 5,276,279 A | * | 1/1994 | Brownlie | H02G 3/10 |
| | | | | 174/50 |
| 5,532,436 A | * | 7/1996 | Moyers | H01R 13/5208 |
| | | | | 174/138 G |

* cited by examiner

*Primary Examiner* — Andrew T Kirsch
(74) *Attorney, Agent, or Firm* — John D. Veldhuis-Kroeze; Westman, Champlin & Koehler, P.A.

(57) ABSTRACT

A modular stackable enclosure system is disclosed herein. The system includes a base structure including a cavity that includes a component mounting surface. The base structure also includes a plurality of modular ports configured to provide openings to the cavity. The base structure also includes a plurality of accessory mount interfaces, configured to receive a plurality of corresponding toolless-attachable accessory mounts. The system also includes a plurality of port plates, each configured to fit into a port of the plurality of modular ports. The system also includes a plurality of port plate attachments, each configured to fit into a corresponding port plate. The system also includes a cover, configurable to attach to the base structure, such that the cover is movable to cover or expose the cavity.

14 Claims, 20 Drawing Sheets

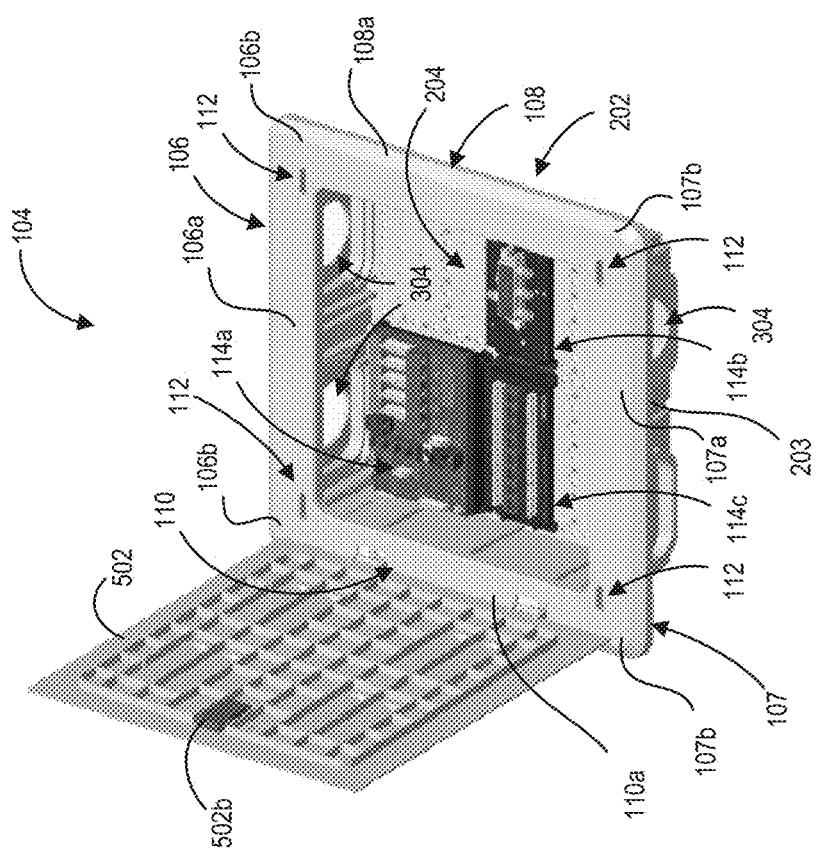
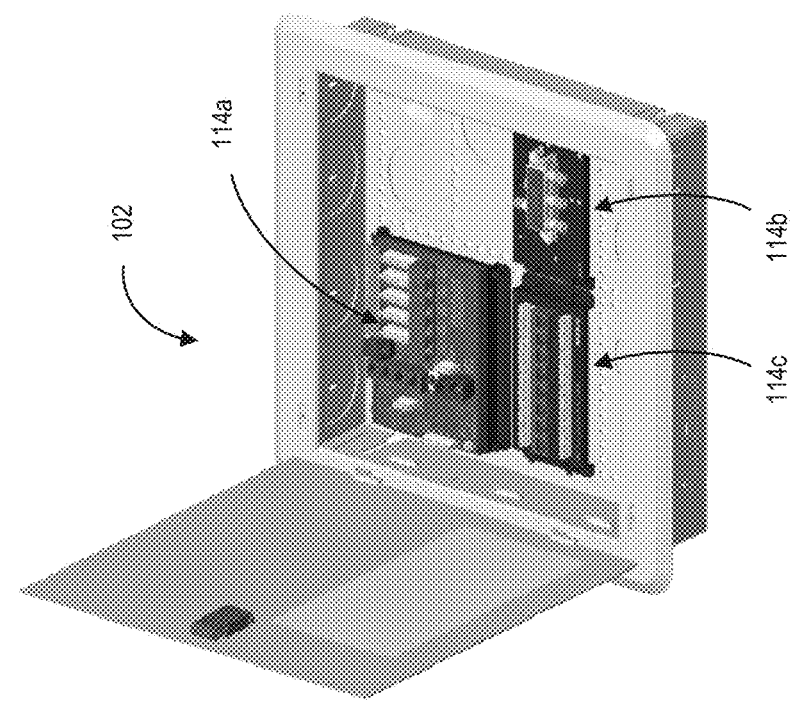
FIG. 1

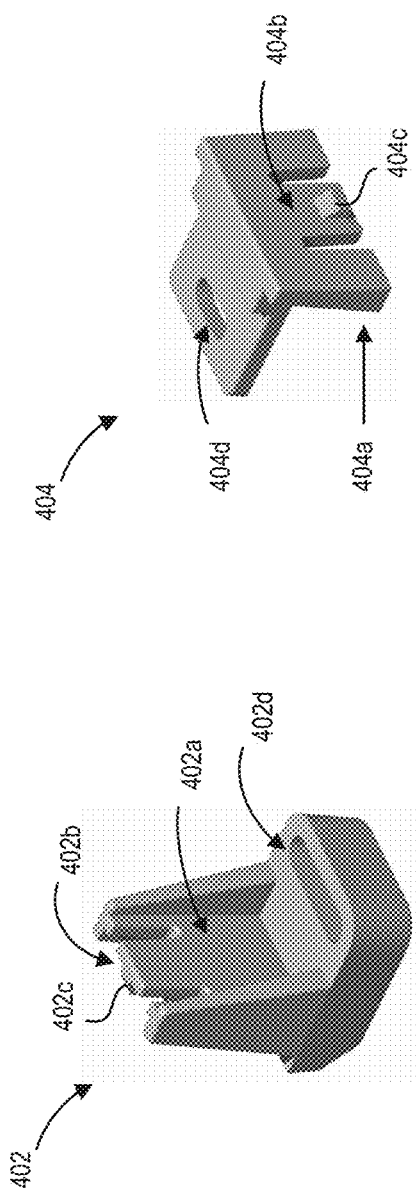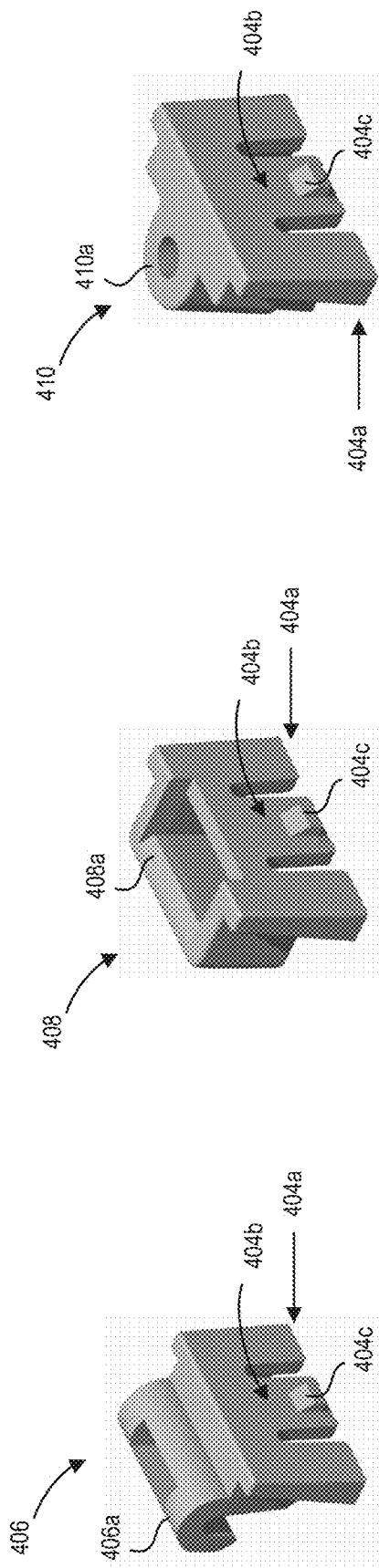
FIG. 4A  FIG. 4B  FIG. 4C  FIG. 4D  FIG. 4E

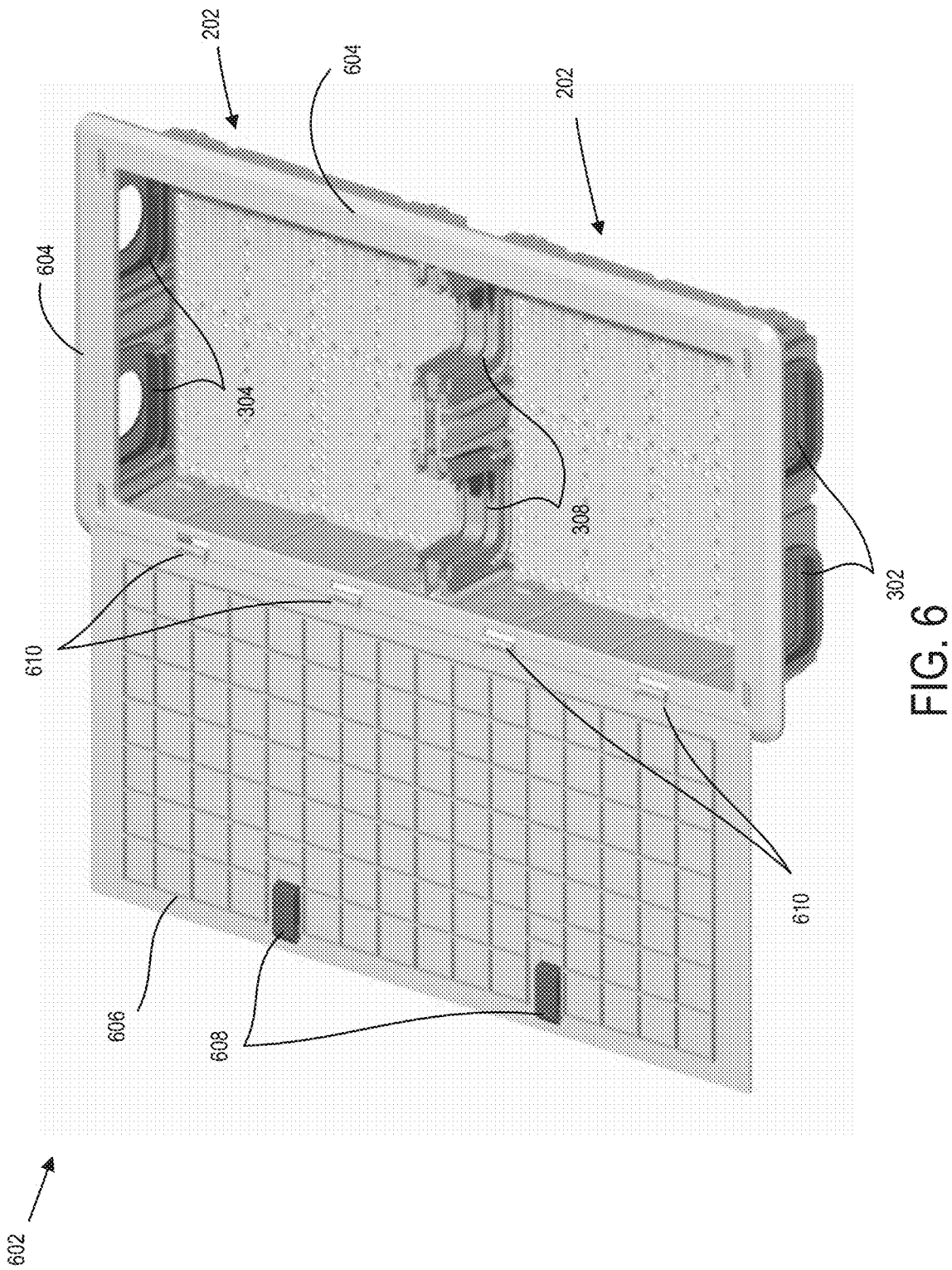

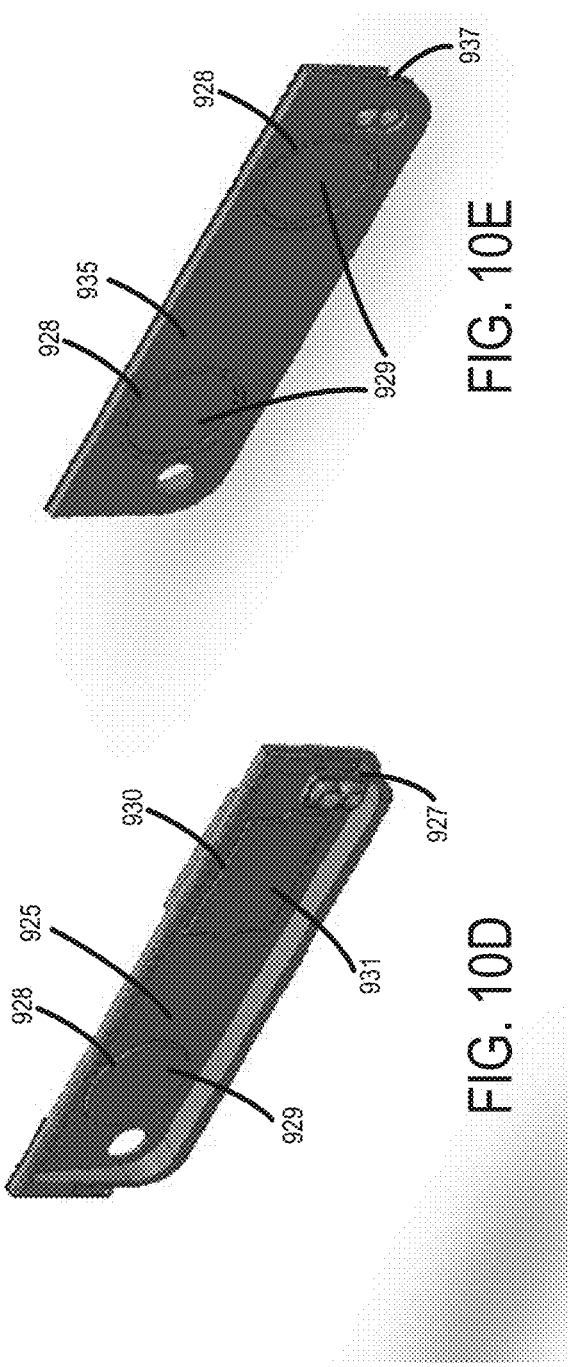

MODULAR STACKABLE ENCLOSURE SYSTEM

CROSS-REFERENCE TO RELATED APPLICATION

The present application is based on and claims the benefit of U.S. provisional patent application Ser. No. 62/334,552, filed May 11, 2016, the content of which is hereby incorporated by reference in its entirety.

BACKGROUND

This application relates to modular stackable enclosure systems, including one or more electrical wiring or telecommunications boxes capable of providing a variety of configurations with minimal configuration efforts and/or without tools.

Telecommunications and electrical wiring enclosures vary widely in structure and function. They can include various shapes and sizes, and provide various functions for telecommunication services such as cable television, Internet, and telephone. Telecommunications enclosures can also exist at different nodes of a telecommunications network. Telecommunications enclosures can include enclosures at a central node of a telecommunications network (such as server enclosures at a server farm), enclosures at intermediate points of the network, and enclosures at terminal nodes.

Intermediate nodes, such as at an intermediate node at a multi-dwelling residence or a residence with a complicated collection of telecommunications services, can include enclosures for their circuitry. Since such circuitry can vary greatly, so can the corresponding enclosures. Also, it is advantageous if intermediate nodes are at one location for servicing. It may also be advantageous if the nodes are contained within one enclosure or one physically combined system of enclosures. Such nodes may include a weatherproof enclosure that is mounted on an exterior surface of a home, a multi-dwelling residence, or office building, or an enclosure mounted on an interior surface.

Enclosures at intermediate nodes may provide distribution of a passive optical fiber network and/or a copper wire network, for example. The telecommunications industry typically utilizes either fiber optic networks or copper wire networks to transmit data, and in many instances requires conversion between fiber optic and copper networks. Both fiber optic networks and copper wire networks require separate circuitry, and conversion circuitry is needed to convert data between the network types. Given the many requirements of the fiber optic and copper networks, it can be difficult to supply both a fiber optic network and a copper wire network to the same home or multi-dwelling residence via one enclosure. Although, maintaining one enclosure is usually more convenient for a technician in the field than maintaining multiple enclosures. Often maintenance can include the process of searching for a telecommunications box, and if there are multiple boxes such a search can take more time. This can especially be the case in a multi-dwelling residence or large office building.

It is common to route fiber optic and/or copper cables from various locations within a premise to one or more enclosures at a central location, for example in the basement or garage of a residential home. Expanding the size of the enclosure to accommodate additional circuitry, components and/or cables can be difficult, sometimes resulting in multiple enclosures having to be used. Further, it can be difficult to configure existing enclosures for differing needs. Thus, in general, there is need for enclosures that can provide improved expandability and/or configurability.

The discussion above is merely provided for general background information and is not intended to be used as an aid in determining the scope of the claimed subject matter.

SUMMARY

The following summary is not intended to be limiting on the scope of what is claimed. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Disclosed herein is an example plastic modular stackable enclosure system capable of producing a wide variety of configurations with minimal production tooling and equipment as well as providing an opportunity for toolless customer configuration in the field. The enclosure system may be used indoors or outdoors. For example, the system may be applied to indoor structured wiring enclosures or indoor and/or outdoor cable distribution terminals. The system may include a structured wiring cabinet. The system may also include a base structure and door cover components that can be configured to construct, with or without tools, multiple standard enclosure sizes (such as 15, 30, and 45 inch sizes) with a variety of port options.

The base structure may include a modular aspect including one or more base panels with one or more identical port openings. For example, each base structure may include a base panel with at least four port openings in which all four openings are identical in structure. The port openings may accept a variety of port plates which interlock with the base structure to provide structural support to the enclosure and/or and toolless port configuration. The port plates may include port couplers that similarly interlock with the port openings of other base structures to create a larger enclosure system by staking base structures.

Further, toolless modular mounting features allow the enclosure to be configured in the factory or in the field to fit a specific mounting application, such as surface mount or in-wall installations. Also, each base structure or combination of structures may be configurable to attach to modular doors that correspond to each base structure or the combinations of base structures as a whole. The modular door covers can include stackable frame sections and door panels that may be configured in the factory or in the field to match a selected enclosure. The frame sections are assembled with end sections, hinge sides, latch sides, and/or couplers all with interlocking features to provide structural support with minimal fasteners, such that the interlocking may be toolless. For example, the door panels may be snapped into the hinge sides, and such panels may have integrated push to close and/or open door latches. The door panels may also include door couplers that can interlock multiple door panels to operate as a single door.

In an example of the plastic modular stackable enclosure system, the base structure may be structurally sufficient for indoor and outdoor applications. In such an example, the port plates and couplers may employ gaskets, grease, and/or caulk to provide weather tight interconnections. This is also the case for parts of the system used to attach mounting brackets, and parts of the system that interact with door hinges, latches, and cover screws to interface with door covers.

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale; emphasis instead is being placed upon illustrating the principles of the system. In the drawings, like referenced numerals designate corresponding parts throughout the different views.

FIG. 1 illustrates perspective views of two different electrical enclosures, one of which is example box of the modular stackable enclosure system.

FIGS. 4A-4E illustrate perspective views of optional toolless-attachable accessory mounts that can attach to corresponding accessory mount interfaces of the example base structure illustrated in FIG. 2.

FIGS. 6-8 illustrate three example configurations of the modular stackable enclosure system using the example base structure illustrated in FIG. 2.

FIGS. 10D and 10E illustrate perspective views of optional toolless-attachable port inserts that can attach to a port of the example base structure illustrated in FIGS. 9A and 9B.

DETAILED DESCRIPTION

Figure 2:
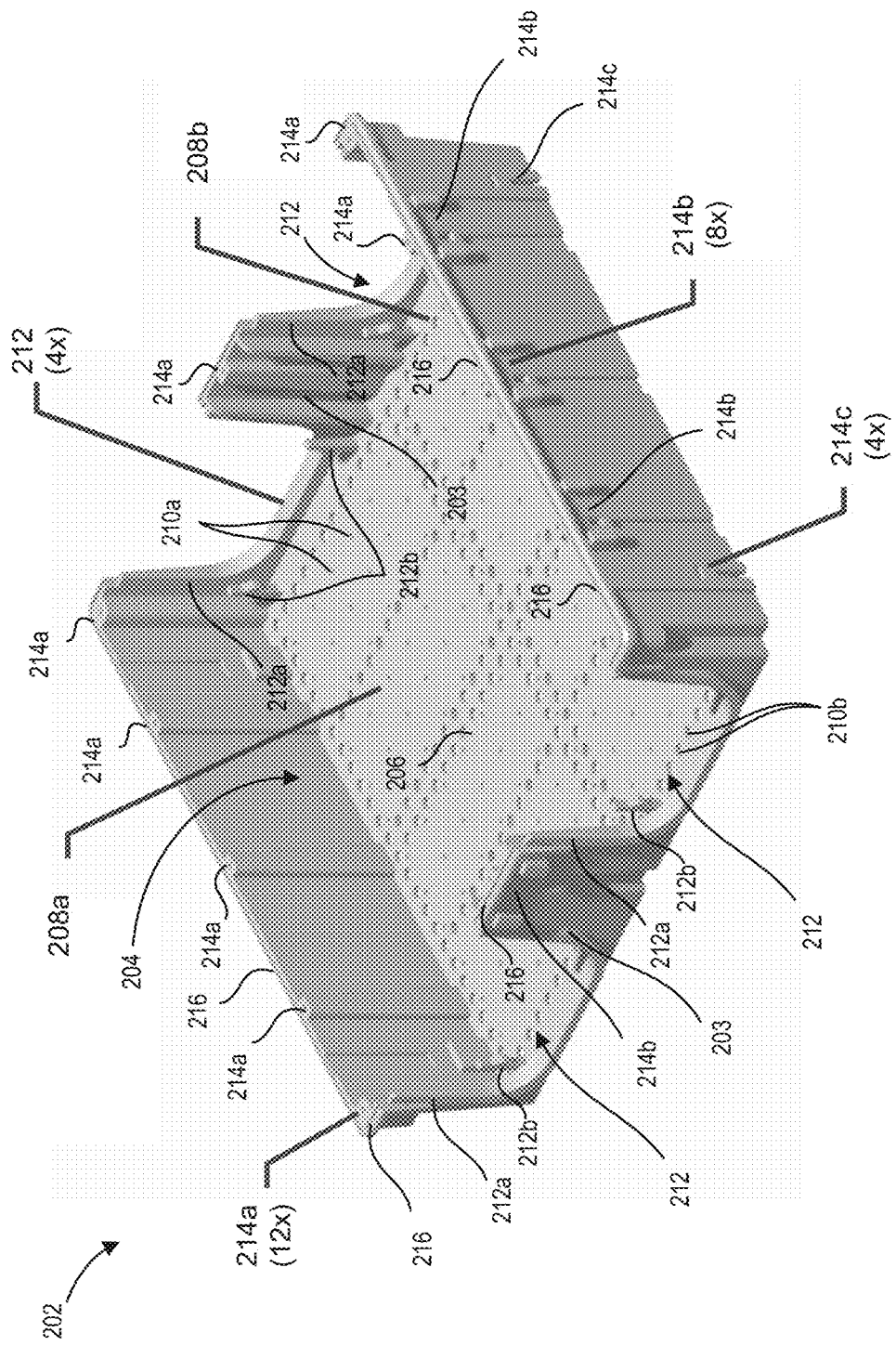
FIG. 2 illustrates a perspective view of an example base structure of the modular stackable enclosure system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "connected," "coupled" and variations thereof are used broadly and encompass both direct and indirect connections and couplings. Further, "connected" and "coupled" are not restricted to physical or mechanical connections or couplings.

Aspects of systems and operations, described herein, labeled as "first", "second", and so on, should not necessarily be interpreted to have chronological associations with each other. In other words, such labels are used to merely distinguish aspects of the systems and operations described herein, unless the context of their use implies or expresses chronological associations.

FIG. 1 illustrates perspective views of two different electrical wiring enclosures or boxes 102 and 104. Box 104 in an example box of the modular stackable enclosure system and box 102 is not. As shown, most of the parts of box 102 are specifically made to fit solely with each other, such that they cannot be taken apart from each other without a tool. Box 102 is made out of metal for the most part. Box 104 is part of a modular stackable enclosure system, for example made of plastic, capable of producing a wide variety of configurations with minimal production tooling and equipment as well as providing an opportunity for toolless customer configuration in the field. Box 104 may be used indoors or outdoors. For example, box 104 may be applied to indoor structured wiring enclosures or indoor and/or outdoor cable distribution terminals. The box 104 may include a structured wiring cabinet in a cavity, such as cavity 204 illustrated in FIG. 1.

The box 104 also includes base structure 202 (illustrated in FIG. 2) and cover 502 (illustrated for example in FIGS. 5A-5C) that can be used to construct, with or without tools, multiple standard enclosure sizes (such as 15, 30, and 45 inch sizes) with a variety of port options. As shown, box 104 makes use of multiple instances of cable port insert 304. Also shown, box 104 includes cover receiving panels 106, 107, 108, and 110. Panels 106 and 107 include respective straight portions 106a and 107a and two respective curve portions 106b and 107b curved in the same direction. Each of the straight portions 106a and 107a include two latch hollows 112. Panels 108 and 110 only include straight portions 108a and 110a. When Panels 106, 107, 108, and 110 are attached to base structure 202 they combined to provide a surface for cover 502 to close and latch onto latch hollows 112. Although not shown, cover 502 in such an arrangement may include hooks that can latch onto corresponding parts in the hollows 112. Also, latch 502b may latch onto an underside of panel 108.

Figure 8:
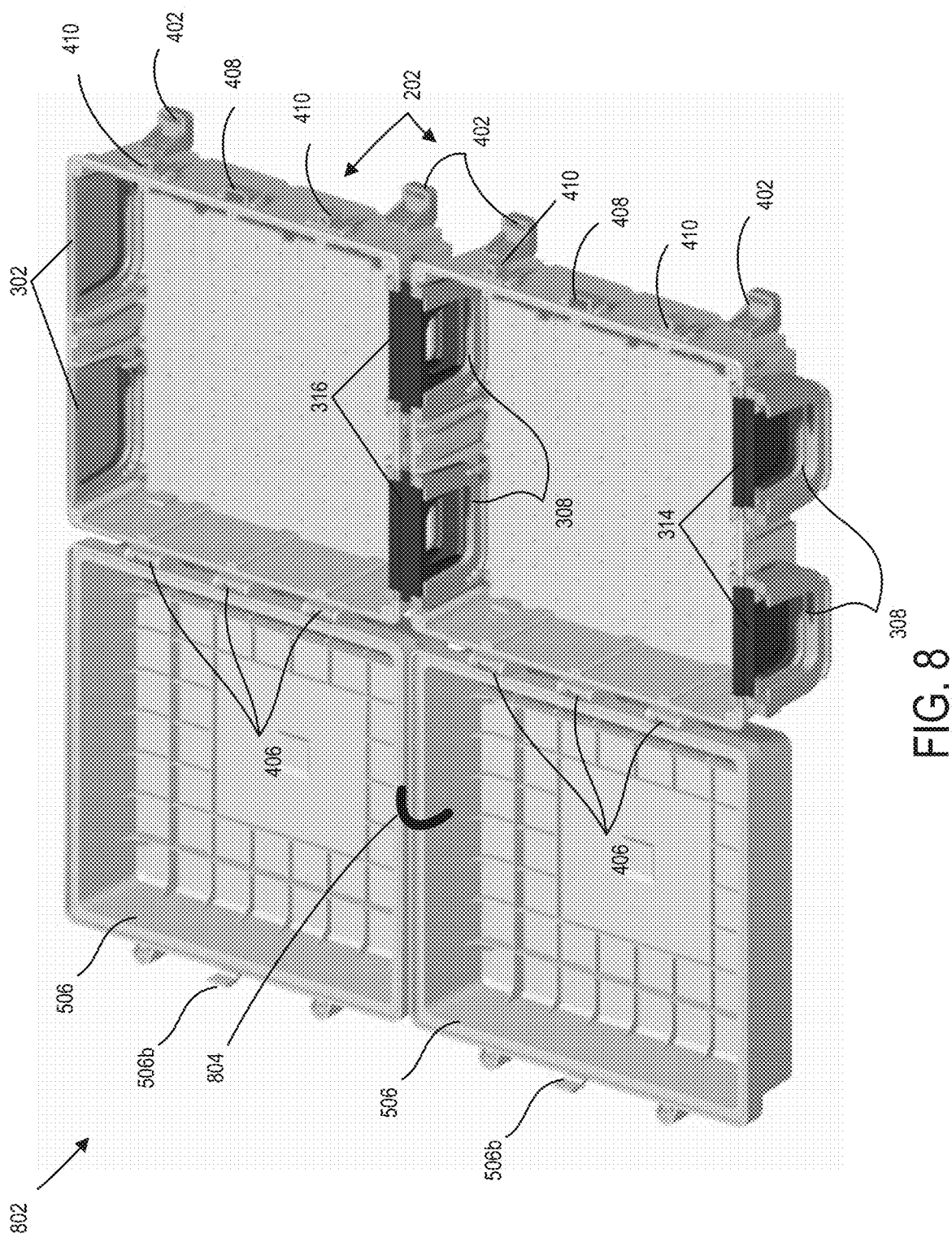

As shown in FIG. 2, the base structure may include a modular aspect including one or more base panels with one or more identical port openings. For example, each base structure 202 includes a base panel 203 with four port openings 212 in which all four openings are identical in structure. Port openings 212 may accept a variety of port plates which interlock with the base structure to provide structural support to the enclosure and/or to provide various toolless port configurations. As shown in the example of FIG. 1, three out of four port openings include an attached cable plate 304 type of port plate. However, more or less of this type of interchangeable port plate can be used, as can other types of port plates. The port plates may also include port couplers that similarly interlock with the port openings of multiple base structures to create larger enclosure systems by stacking base structures (as shown in FIGS. 6 and 8).

Further, toolless modular mounting features allow the enclosure to be configured in the factory or in the field to fit a specific mounting application, such as surface mount or in-wall installations. For example, cover panels 106, 107, and 108 can attach to box 104 such that the box can be inserted into a wall with the cover panels extending flush with and out from the wall.

Also, each base section or combination of sections may be configurable to attach to modular door covers (such as any one of the door covers shown in FIGS. 5A-5C) that correspond to each base structure or the combinations of base structures as a whole. The modular door covers can include stackable frame sections and door panels that may be configured in the factory or in the field to match a selected enclosure. The frame sections, which may include base structure 202, may be assembled with end sections such as cover receiving panels 106 and 107, a hinge side such as cover receiving panel 110, a latch side such as cover receiving panel 112, and/or couplers all with interlocking features to provide structural support with minimal fasteners, such that the interlocking may be toolless. In an example, the cover receiving panel 110 may be snapped into a hinge side of the base structure 202, and enable swinging of the cover or a door of the cover. Also, cover panel 108 may have integrated push to close door latches such that a cover can latch onto the panel. Such a panel may be snapped into a latch side of the base structure 202. Also, the hollows 112 may include a structure for receiving movable hooks attached to cover 502 of a push to close door latch mechanism. The door panels may also include door couplers that can interlock multiple door panels to operate as a single door (as shown by coupler 804 in FIG. 8).

In an example of the plastic modular stackable enclosure system, the base structure may be structurally sufficient for indoor and outdoor applications. In such an example, the port plates and couplers may employ gaskets, grease, or caulk to provide weather tight interconnections. This is also the case for parts of the system used to attach mounting brackets, and parts of the system that interact with door hinges, latches, and cover screws to interface with covers configured to fit with corresponding base structures.

Referring again to FIG. 2, illustrated is a perspective view of an example base structure 202 of the modular stackable enclosure system. Base structure 202 includes cavity 204. Cavity 204 includes component mounting surface 206. Component mounting surface 206 includes a component mounting pattern. The component mounting pattern includes a plurality of component mounting holes (such as holes 210a and 210b) that are configured to receive a plurality of corresponding component mounting fasteners. The component mounting pattern includes a plurality of component mounting sub-patterns (such as sub-patterns 208a and 208b). Each of the sub-patterns 208a and 208b includes respective component mounting holes 210a and 210b. The holes of a sub-pattern may be arranged in a grid. Grids of sub-patterns in cavity 204 may be distinctive from each other or may be commingled. For example, sub-patterns may be distinguishable from each other by having a respective differing hole sizes per pattern, as shown in FIG. 2. Also, each pattern may be adapted for a different standard for mounting electrical components such as components 114a, 114b, and 114c illustrated in FIG. 1.

The base structure 202 also includes four modular ports 212 configured to provide openings to cavity 204. In other examples, the number of modular ports to the cavity of the base structure may vary. The ports may be configured to receive various types of inserts for different electrical parts standards or uses. For example, an insert may be configured for a certain size conduit or cord with a certain diameter. In examples, ports may include deep ridges that mate with corresponding parts of inserts, or vice versa. The ports may include various shapes and sizes depending on the application of the base structure. All the ports of a base structure may be the same dimensions, such that each port can be used universally with a corresponding set of inserts sized for the ports.

Each port 212 includes a tongue 212a to receive a corresponding groove of a port insert. Also, beside each port 212 is a pair of opposing latch parts 212b that correspond to latch parts of a port insert. Tongue 212a and a corresponding groove on an insert guide the insert into port 212. Latch parts 212b can couple corresponding latch parts of a port insert to lock the insert into place in port 212.

Figure 7:
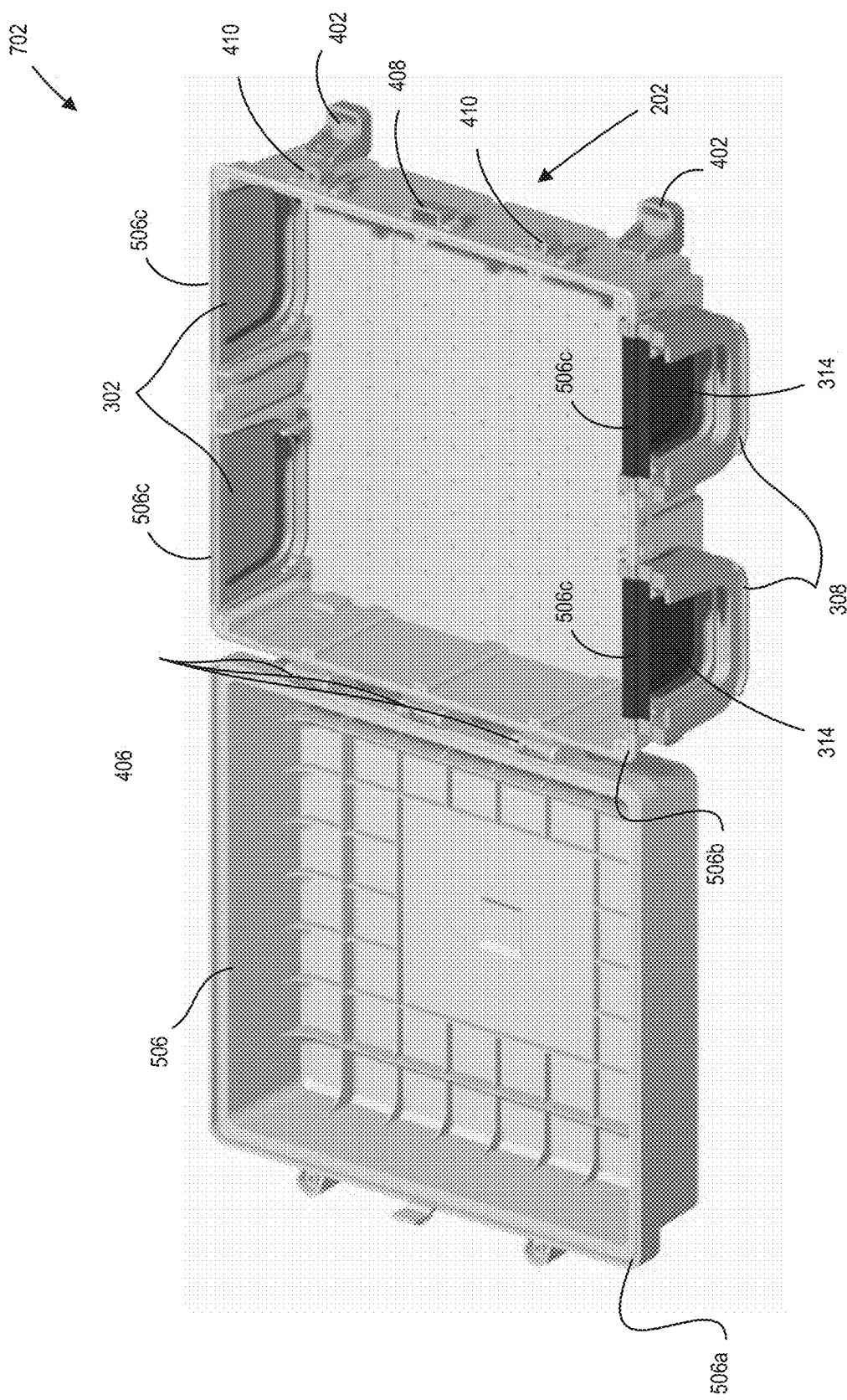

The base structure 202 also includes groove 216 for receiving a respective tongue of a door cover. In some examples, alternatively, base structure 202 may include the tongue and the cover may include the corresponding groove. In FIG. 7, groove 506a can fit with tongue 506b of base structure 202.

As also shown in FIG. 2, groove 216 is broken at each port 212. However, once each port includes an insert with a matching groove, the resulting combined groove is no longer broken and becomes seamless or substantially seamless. In other embodiments, matching or aligned grooves between base structure 202 and a port insert are not seamless, but provide a substantially continuous groove for sealing the enclosure. This can provide an enhance seal for a door cover of base structure 202. In the configuration in FIG. 7, tongue 506b is broken at each port 212 too and made "seamless" or substantially continuous with inserts 302 and 314 that include tongues 506c aligned with tongue 506b.

The base structure 202 can also include multiple or a plurality of accessory mount interfaces (such as mount interfaces 214a, 214b, and 214c). As depicted in FIG. 2, in an exemplary embodiment, there are twelve interfaces 214a, eight interfaces 214b, and four interface 214c, though more or fewer of these interfaces can be present. An accessory mount interface may be configured to receive an attachable accessory mount with a corresponding interface such that a mount structure can attach to the base structure. An attachable accessory mount structure may include a surface mount, a flush mount, a cover hinge mount, cover latch mount, and a cover screw boss mount, for example. The accessory mount interfaces may include accessory mount interface holes. For example, such holes may include cover mounting holes.

The base structure 202 and the other components described herein may be made out of plastic entirely or partially. The plastic may be substantially flexible at parts of the base structure such that parts of the system can be assembled without tools.

In an example, the base structure may be mounted to a wall or another type of mountable structure either on or flush to a surface of that structure. Also, the based structure may be mounted to a wall or another type of mountable structure in such a way that a cover of the base structure is flush to a surface of the mounted structure.

FIGS. 3A-3H illustrate perspective views of optional port inserts that can attach to a port 212 of the example base structure 202 illustrated in FIG. 2. Specifically, FIGS. 3A-3D illustrate views of optional port inserts that can attach directly into a port of a base structure. Such inserts can include ports plates such as blank plate 302, cable plate 304, electrical outlet plate 306, and a stacking coupler plate 308. FIGS. 3E-3H illustrate views of optional port inserts that can attach indirectly into the port by directly attaching to a sub-port of a plate directly attached to the port. Such inserts can include sub-port plate inserts such as cable grommet sub-plates 310, 110 outlet kit 312, coupler grommet sub-plate 314, and stacking grommet sub-plate 316.

Blank plate 302 includes a groove 302a corresponding to tongue 212a of port 212. Blank plate 302 also includes a latch part 302e that can latch onto latch parts 212b of port 212. The blank plate 302 can function as a cover and seal of port 212. The tongue and groove mechanism of the plate 302 and port 212 allow for seals that can withstand even outdoor applications. To further weatherproof the seal, grease or caulk can be added to the tongue and groove mechanism. Blank plate 302 also includes groove 302b that can align with groove 216 of base structure 202 when the plate is fully inserted into port 212. The combination of grooves 302b and 216 provide a seamless groove along that periphery portion of base structure 202, such that when all ports are full with inserts a tongue of a cover can mate a seamless or substantially continuous groove when a cover is completely closed onto the base structure. This tongue and grove mechanism can provide a relatively weather-resistant seal that can be improved with grease or caulk.

Cable plate 304 includes a groove 304a corresponding to tongue 212a of port 212. Cable plate 304 also includes a latch part 304e that can latch onto latch parts 212b of port 212. The tongue and groove mechanism of the plate 304 and port 212 allow for seals that can withstand even outdoor applications. To further weatherproof the seal, grease or caulk can be added to the tongue and groove mechanism. Cable plate 304 also includes groove 304b that can align with groove 216 of base structure 202 when the plate is fully inserted into port 212. The combination of grooves 302b and 216 provide a seamless or substantially continuous groove along the periphery portion of base structure 202, such that when all ports are full with inserts a tongue of a cover can mate a seamless or substantially continuous groove when a cover is completely closed onto the base structure. This seamless tongue and grove mechanism can provide a relatively weather-resistant seal that can be improved with grease or caulk.

Cable plate 304 also includes a sub-port 304c for port 212 such that a cable or conduit matching the diameter of sub-port 304c can fit through the sub-port and provide a seal. The sub-port 304c can vary in size and shape to conform to different conduits and cables. As shown, sub-port 304c is circular and sized for a specific sized cable (such a 2.5" diameter cable). The seal between a cable or conduit and the sub-port 304c can be enhanced with grease or caulk.

Outlet plate 306 includes a groove 306a corresponding to tongue 212a of port 212. Outlet plate 306 also includes a latch part 306e that can latch onto latch parts 212b of port 212. The tongue and groove mechanism of the plate 306 and port 212 allow for seals that can withstand even outdoor applications. To further weatherproof the seal, grease or caulk can be added to the tongue and groove mechanism. Outlet plate 306 also includes groove 306b that can align with groove 216 of base structure 202 when the plate is inserted into port 212 fully. The combination of grooves 306b and 216 provide a seamless groove along that periphery portion of base structure 202, such that when all ports are full with inserts a tongue of a cover can mate a seamless or substantially continuous groove when a cover is completely closed onto the base structure. This seamless tongue and grove mechanism can provide a relatively weather-resistant seal that can be improved with grease or caulk.

Outlet plate 306 also includes sub-port 306c of port 212 such that an outlet, for example an electrical outlet or an electronic peripheral outlet, can be fully presented when outlet cover 306d is swung opened. An edge of sub-port 306c can include a hinge for outlet cover 306d such that the cover can swing open and close. Also, a latch can be used on the opposing side of the cover and the sub-port such that the cover can lock into place when closed. The sub-port 306c can vary in size and shape to conform to different outlet types, such as 110 outlets, USB outlets, and coax cable outlets. As shown, sub-port 306c is rectangular and sized for a specific sized outlet (such a 110 electrical outlet). The seal between cover 306d and the sub-port 306c can be enhanced with grease or caulk.

Stacking coupler plate 308 includes grooves 308a' and 308a" corresponding to respective tongues of respective ports of two base structures 202. Stacking coupler plate 308 also includes latch parts 308e' and 308e" that can latch onto two respective latch parts of ports of the two base structures. The tongue and groove mechanisms of the plate 308 and ports of two base structures allow for seals that can withstand even outdoor applications. To further weatherproof the seals, grease or caulk can be added to the tongue and groove mechanism. Stacking coupler plate 308 also includes grooves 308b' and 308b" that can align with respective grooves (such as groove 216) of two base structures when the plates are inserted into ports of the based structures fully. The combination of grooves 308b' and 308b" with the upper grooves (such as groove 216) of the two base structures can provide seamless or substantially continuous grooves along the entire periphery of the base structures when all the ports are full, such that tongues of corresponding covers can mate the seamless grooves when the cover is completely closed onto the stacked base structures. This seamless tongue and grove mechanism can provide a relatively weather-resistant seal that can be improved with grease or caulk.

Stacking coupler plate 308 also includes sub-port 308c of port 212 such that another type of plate such as a smaller version of plate 302, 304, or 306 can fit into the sub-port. When two base structures 202 are stacked using the stacking coupler plate 308 it is advantages to fit two of the same sub-plates into the sub-ports 308c. For example, two smaller cable plates may be inserted such that a cable can run from one stacked base structure to the other. The sub-port 308c can vary in size and shape to conform to different sub-plates that can insert into grooves 308d' and 308d". Grooves 308d' and 308d" can vary in size and shape according to application. The seal between sub-plates and the sub-port 308c can be enhanced with grease or caulk. Also, although the stacking coupler plate 308 includes grooves 308d' and 308d" in FIG. 3D, in another example such a plate could include tongues at the same positions such that corresponding sub-plates would have receiving grooves. In the instances depicted in the drawings, the sub-plates have tongues instead (see FIGS. 3G and 3H, for example), but in other examples the sub-plates could include the groove parts.

FIGS. 3E-3H illustrate views of optional port inserts that can attach indirectly into port 212 by directly attaching to a sub-port of a plate directly attached to the port. Such inserts can include sub-port plate inserts such as cable grommet sub-plates 310, 110 outlet kit 312, coupler grommet sub-plate 314, and stacking grommet sub-plate 316. These sub-port plate attachments can each be configured to fit into a corresponding port plate. Sub-plates can be inserted into corresponding sub-ports of plate inserts to form seals, and such seals between sub-plates and the sub-ports can be enhanced with grease or caulk.

Figure 3A:
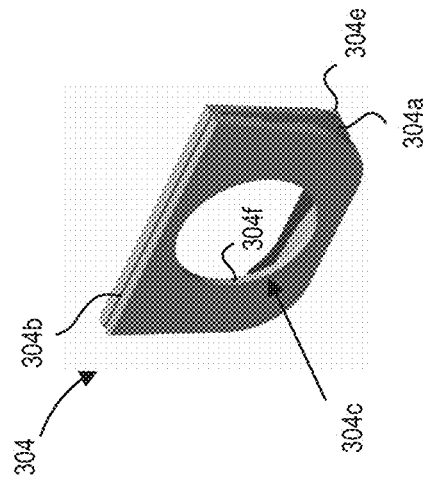
FIGS. 3A-3H illustrate perspective views of optional toolless-attachable port inserts that can attach to a port of the example base structure illustrated in FIG. 2.
Figure 3B:
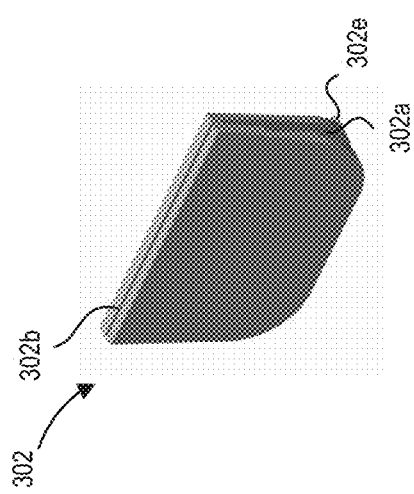
Figure 3C:
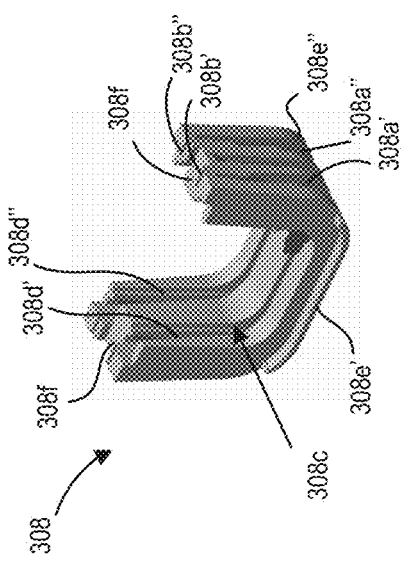
Figure 3D:
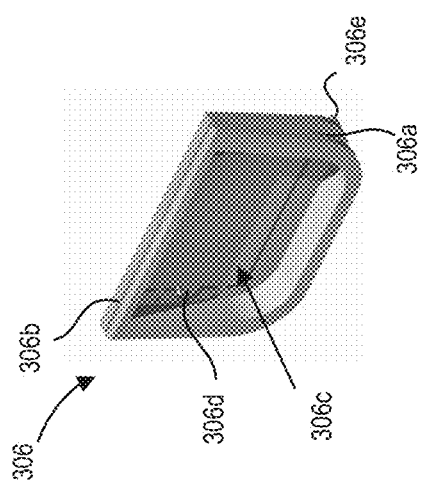
Figure 3F:
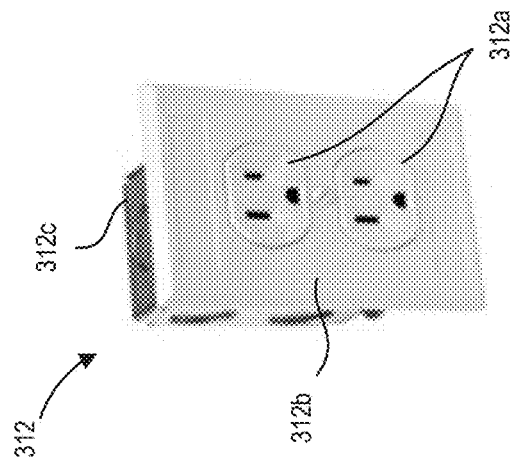
Figure 3H:
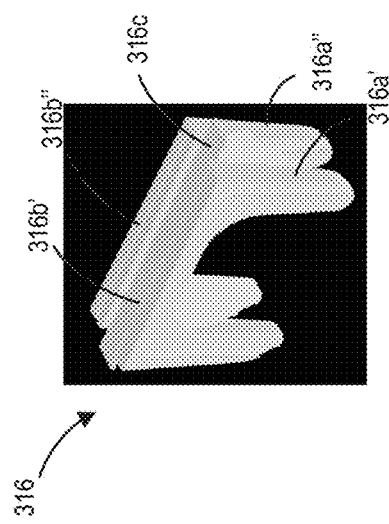
Figure 3E:
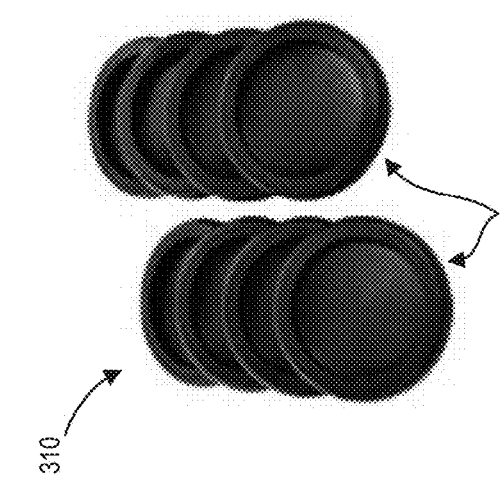

In FIG. 3E, a plate of cable grommet sub-plates 310 can snap into sub-port 304c. Such a sub-plate can include groove 310a that can receive edge 304f of sub-port 304c. Edge 304f can act as a tongue in a tongue and groove mechanism with grove 310a of one of sub-plates 310. This tongue and grove mechanism can provide a relatively weather-resistant seal that can be improved with grease or caulk.

In FIG. 3F, 110 outlet kit 312 includes electrical outlets 312a, an outlet plate 312b, and corresponding electrical components within housing 312c. Housing 312c can include fasting parts to fasten kit 312 to mounting sub-pattern 208a or 208b of the base structure 202, such that electrical outlets are exposed when outlet plate 306 is installed and cover 306d is open.

Figure 3G:
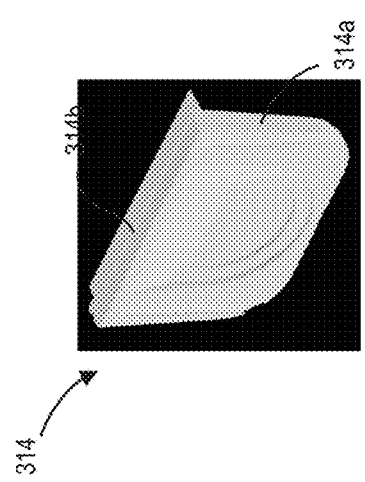

In FIG. 3G, coupler grommet sub-plate 314 includes tongue 314a that can fit into groove 308d' or 308d''. Coupler grommet sub-plate 314 also includes groove 314b (for example providing grooves 506c shown in FIG. 7 and discussed above). Groove 314b can align with groove 308b' or 308b'' and groove 216 of base structure 202 when the sub-plate is fully inserted into stacking coupler plate 308 while the stacking coupler plate 308 is fully inserted into port 212. The combination of grooves 314b, 308b' or 308b'', and 216 can provide a seamless or substantially continuous groove along the entire periphery of base structure 202 when all ports and sub-ports are full, such that a tongue of a cover can mate the seamless groove when the cover is completely closed. This seamless tongue and grove mechanism can provide a relatively weather-resistant seal that can be improved with grease or caulk.

In FIG. 3H, stacking grommet sub-plate 316 includes tongues 316a' and 316a'' that can fit into grooves 308d' and 308d'', accordingly. Stacking grommet sub-plate 316 also includes a flat covering part 316c that aligns with edges 308f of stacking coupler plate 308 to further encompass sub-port 308c.

Stacking grommet sub-plate 316 also includes grooves 316b' and 316b''. Grooves 316b' and 316b'' can align with grooves 308b' and 308b'', accordingly, and two respective grooves 216 of two base structures 202 when sub-plate 316 is fully inserted into stacking coupler plate 308 while the stacking coupler plate is fully inserted into two respective ports 212. The combination of grooves 316b' and 316b'', 308b' and 308b'', and the two respective grooves 216 of two base structures 202 can provide one or two seamless or substantially continuous grooves along the entire periphery of each of the two base structures 202 when all respective ports are filled, such that a tongue or tongues of a cover or covers, respectively, can mate the seamless groove(s) when the cover(s) are completely closed onto the base structures. Likewise, this seamless tongue and grove mechanism can provide a relatively weather-resistant seal that can be improved with grease or caulk.

FIGS. 4A-4E illustrate perspective views of optional toolless-attachable accessory mounts that can attach to corresponding accessory mount interfaces of the example base structure illustrated in FIG. 2. FIG. 4A illustrates surface mount 402. FIG. 4B illustrates flush mount 404. FIG. 4C illustrates a cover hinge mount 406. FIG. 4D illustrates cover latch mount 408, and FIG. 4E illustrates cover screw boss mount 410. These mounts can attach to corresponding mount interfaces of base structure 202 by a toolless fastening mechanism, such as a snap-fit or clasp and hook structure.

Surface mount 402 can attach to mount interface 214c of the base structure 202 by a toolless fastening mechanism, such as a snap-fit or clasp and hook structure. Flush mount 404, cover hinge mount 406, cover latch mount 408, and cover screw boss mount 410, each can attach to mount interface 214b of the base structure 202 by a toolless fastening mechanism, such as a snap-fit or clasp and hook structure. As depicted by FIGS. 4A-4E, a cantilever snap-fit structure is illustrated to interact with the mount interfaces of FIG. 2. In other examples, other types of snap-fit structures may be used.

In examples, a snap-fit structure, which may include integral attachment parts, is an attachment system used to attach flexible parts, such as flexible plastic parts, to form a final product by pushing interlocking components of attaching parts together. There are a number of variations in snap-fits structures that could be used by the system, including cantilever, torsional and annular snap-fits structures. The annular snap-fit structure may use hoop-strain to hold into place. Hoop-strain refers to the piece that is more elastic than the other and will be pushed on top sealing the more rigid piece. Such a configuration can be circular.

A cantilever snap-fit structure can be used to temporarily or permanently fix to objects. For temporarily fixing structures, a multiple use snap-fit can be used and can have a lever or pin to be pushed in order to undo the snap-fit. With a permanent snap-fit there may be no lever or pin. A potential problem with being able to undo a snap-fit is hyper-extending it past its breaking point. As a solution, some parts of a snap-fit structure can have a stopper in order to stop the snap-fit from breaking.

A torsional snap-fit structure may in include a part that must be deflected, or forced to fit by protruding edges of a first piece of the structure away from the insertion area. A second piece then slides in between the protruding edges until the desired distance is reached. The edges of the second piece are then released and first piece is held in place. The snap-fit structures in this description are the protruding edges of the second piece. These types of snap-fits may have a spring in place; so that when activated, the locked in piece is released and put into action.

As mentioned, cantilever snap-fits of FIGS. 4A-4E are illustrated to interact with the corresponding mount interfaces of FIG. 2. Surface mount 402 includes insertion part 402a with lever 402b and extension part 402c. Mounts 404-410 include insertion part 404a with lever 404b and extension part 404c. At least the insertion parts may be inserted into corresponding receiving hollows of the mount interfaces of the base structure 202. The shape of the extension part that is on the lever of either lever 402b or 404b allows the insertion part to be moved into the receiving hollow a certain distance. Once the insertion part is at the certain distance the part is locked into the interface until the lever is pushed downward. A slanted portion of the extension part (as illustrated) allows for such functionality. A back portion of the extension part proximate to the end of the slanted portion locks the insertion part with the mount interface until the lever is pushed downward. During insertion, the slanted portion moves against a surface of the hollow until the extension part is at the end of that surface. The back portion is then locked against another surface adjacent to first mentioned surface of the hollow until the lever is pushed downward.

Surface mount 402 includes loop 402d that can receive a fastener for fastening base structure 202 to a surface of a wall. Flush mount 404 includes loop 404d that can receive a fastener for fastening base structure 202 to an inner surface of a wall enclosing part of the base structure such that a cover on the base structure can close flush to the wall.

Cover hinge mount 406 includes a half-loop structure 406*a* that can join another half-loop structure of a cover, such that a hinge part is provided. Cover latch mount 408 includes loop 408*a* that can receive a corresponding latch part of a cover to lock the cover closed with respect to the base structure. Cover screw boss mount 410 includes a screw boss 410*a* that can receive a fastener for fastening a cover over the cavity of a base structure.

Figure 5A:
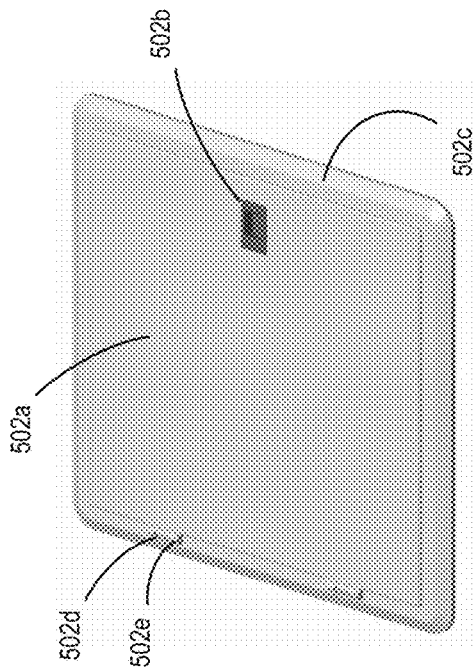
FIGS. 5A-5C illustrate perspective views of optional covers that can attach to the example base structure illustrated in FIG. 2.
Figure 5B:
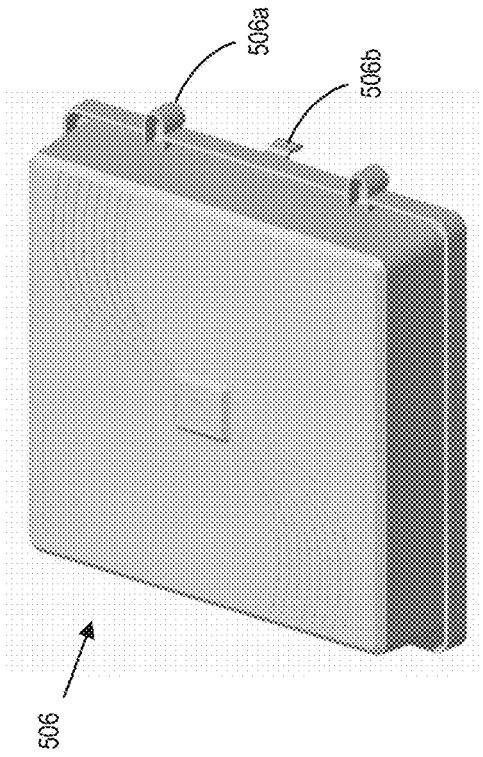
Figure 5C:
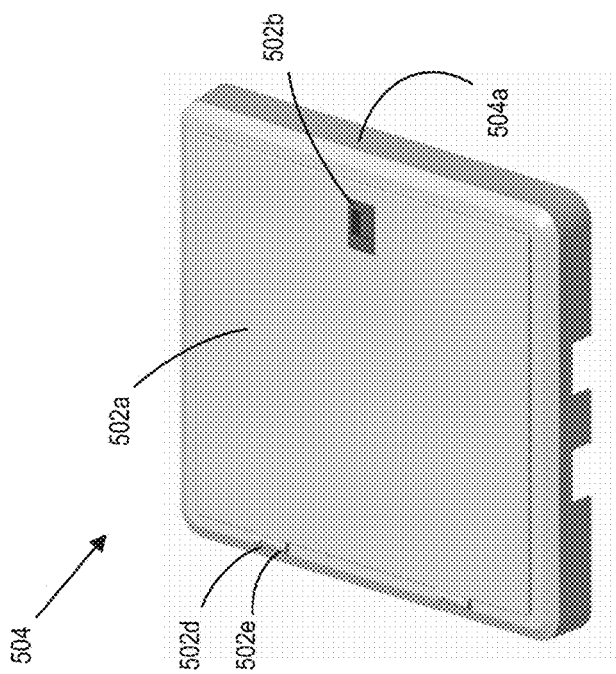

FIGS. 5A-5C illustrate perspective views of optional covers that can attach to the example base structure 202 illustrated in FIG. 2. FIGS. 5A and 5B illustrate covers 502 and 504, which are both for indoor applications where the base structure is attached to a wall, typically within a hollow of the wall such that the covers close flush or near flush to the wall. As shown in FIG. 5B, cover 504 has a deeper cavity than cover 502. FIG. 5C illustrates cover 506, which may be for indoor or outdoor applications wherein the base structure is attached to an outer surface of a wall.

Covers 502, 504, and 506 are configurable to attach to the base structure 202, such that they are movable to cover or expose cavity 204. Each of these covers are attachable to base structure 202 via a cover hinge mount, such as mount 406, a cover latch mount, such as mount 408, a cover screw boss mount, such as mount 410, and/or at least one of the plurality of cover mounting holes 214*a*.

Cover 502 includes door 502*a*, latch 502*b*, door frame 502*c*, and hinge 502*d*. Door 502*a* includes door hinge part 502*e* which is shown connected to hinge 502*d*. Hinge 502*d* is shown connected to door frame 502*c*. Door 502*a* also includes latch 502*b* that can latch to cover latch loop 408*a* when the door is closed against base structure 202 and cover latch mount 408 is attached to the base structure. Not depicted, frame 502*c* may include holes for fastening the frame to base structure 202 via holes 214*a* of the base structure.

Cover 504 includes door 502*a*, latch 502*b*, deep door frame 504*a*, and hinge 502*d*. Door 502*a* includes door hinge part 502*e* which is shown connect to hinge 502*d* (and such can be connected via a hinge pin). Hinge 502*d* is shown connected to door frame 504*a*. Door 502*a* also includes latch 502*b* that can latch to cover latch loop 408*a* when the door is closed against base structure 202 and cover latch mount 408 is attached to the base structure accordingly. Not depicted, deep frame 504*a* may include holes for fastening the frame to base structure 202 via holes 214*a* of the base structure.

Cover 506 includes screw boss 506*a* and latch part 506*b*. Cover 506 includes a door hinge part which can connect to cover hinge mount 406 via a hinge pin. Latch part 506*b* can latch to cover latch loop 408*a*, when the cover is closed against base structure 202 and cover latch mount 408 is attached to the base structure accordingly. Alternatively, latch part 506*b* can latch to a rim portion of an upper part of the base structure. Screw boss 506*a* may include holes for fastening cover 506 to base structure 202 via an attached cover screw boss mount 410. The mount 410 is then attached to the base structure 202, such that the hole of the screw boss 410*a* is aligned with the hole of the screw boss 506*a*.

In an example, the cover may include vents, such that heat from electrical components installed in the cavity can be vented out via the vents. Although not depicted, any of the covers 502-506 can include such vents. Also, any of these covers may be mounted to the base structure using ONT or GATEWAY technologies.

FIGS. 6-8 illustrate three example configurations of the modular stackable enclosure system using the example base structure 202 illustrated in FIG. 2.

FIG. 6 illustrates enclosure or configuration 602 that includes two stacked base structures 202 coupled by two stacking coupler plates 308. The top base structure 202 includes two cable plates 304 such that cables can extend out the top of configuration 602 and the bottom base structure 202 includes two blank plates 302 such that no cables or extensions can extend out of the bottom of configuration 602. A double-sized door cover, which appears to be an indoor cover, is attached to the two base structures. The cover includes a frame 604, a door 606, and two latches 608 that are configured to latch underneath the frame 604 to fasten the door to the frame. The cover also includes door hinges 610 on an opposing side of the door 606 from the latches 608.

FIG. 7 illustrates enclosure or configuration 702 that includes base structure 202 with surface mounts 402, cover hinge mounts 406, cover latch mount 408, and cover screw boss mounts 410 attached. Attached via the hinge mounts to the base structure is cover 506. Also, shown is blank plates 302 inserted into the two upper ports 212 of the base structure. Also, shown is stacking coupler plates 308 inserted into the two lower ports 212 of the base structure 202. Also, shown is coupler grommet sub-plates 314 inserted into the stacking coupler plates 308.

FIG. 8 illustrates enclosure or configuration 802 that includes two stacked base structures 202 coupled by stacking coupler plates 308. The top base structure includes two cable blank plates 302 such that cables cannot extend out the top of configuration 802 and two stacking grommet sub-plates 316 inserted into two stacking coupler plates 308 such that cables or extensions can extend out of the bottom of the top base structure into the bottom base structure. Also, shown is stacking coupler plates 308 inserted into the two lower ports 212 of the bottom base structure. Also, shown is coupler grommet sub-plates 314 inserted into these stacking coupler plates 308.

In configuration 802, the two base structures 202 each have surface mounts 402, cover hinge mounts 406, cover latch mount 408, and cover screw boss mounts 410 attached. Attached via the hinge mounts to the base structure are two covers 506. Also, depicted is a double-sized door cover comprised of two covers 506 coupled to each other by coupling part 804 in some embodiments to cause the two covers to open and close together. In other embodiments, the two covers open and close independently and coupling part 804 is not needed. This double-sized door cover is attached to the two base structures via hinges 406. The cover also includes two latches 506*b* configured to latch to loops 408*a* of cover latch mounts 408. The cover also includes door hinges on an opposing side of the latches.

Figure 9A:
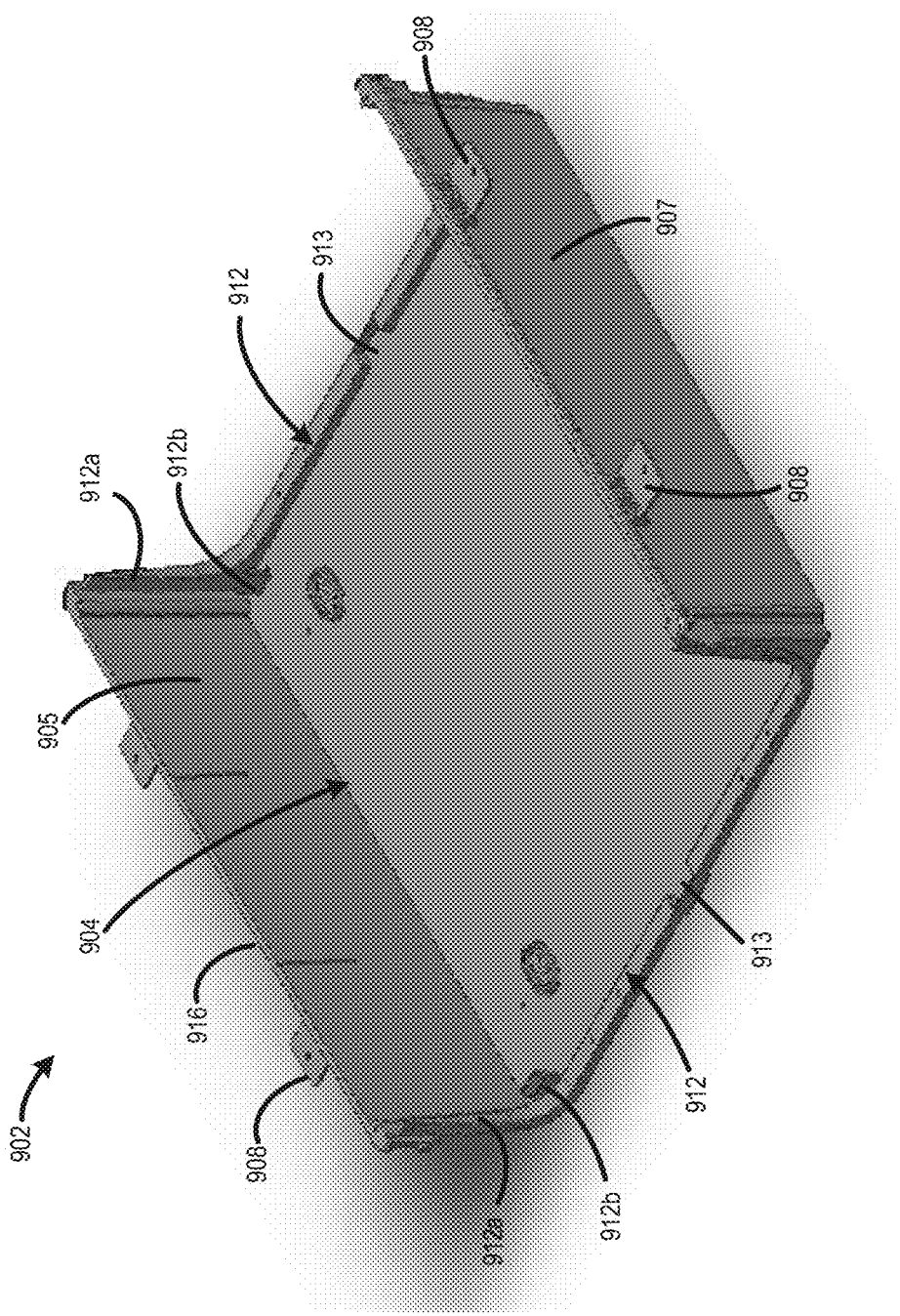
FIGS. 9A and 9B illustrate perspective views of another example base structure of the modular stackable enclosure system.
Figure 11:
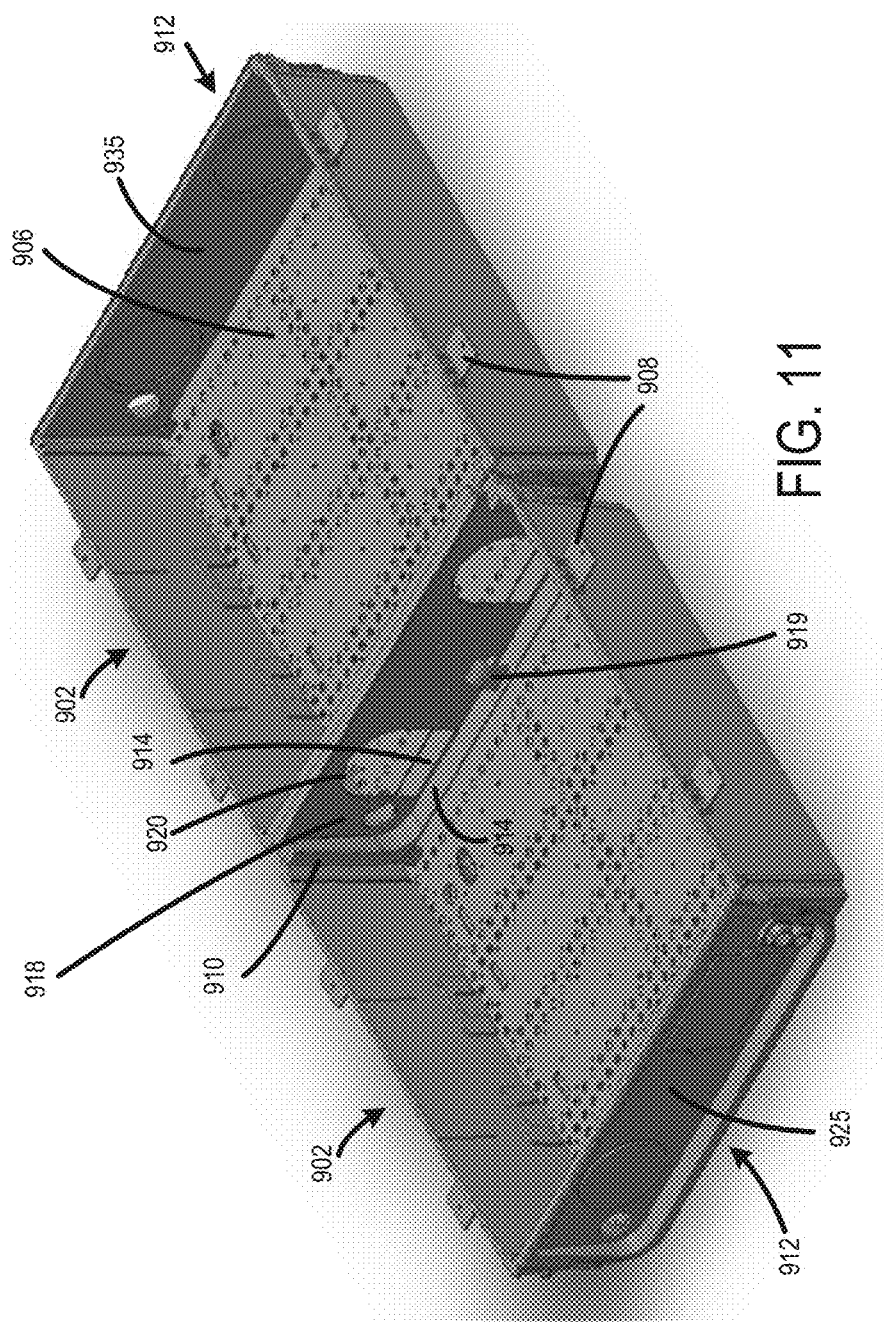
FIG. 11 illustrates an example configuration of the modular stackable enclosure system using the example base structure illustrated in FIGS. 9A and 9B.

Referring now to FIG. 9A, shown is an alternate enclosure base structure 902 in accordance with disclosed embodiments. Base structure 902 is similar in respects to base structure 202 and has similar features to those discussed above, but with wider port openings extending across two ends. As shown in FIG. 9A, the base structure 902 may include a modular aspect including one or more base panels with one or more identical port openings. For example, each base structure 902 includes base panel sides 905 and 907 which partially form a cavity 904. At the remaining two sides of base structure 902, two port openings 912 are provided which are identical in structure. Port openings 912 may accept a variety of port plates which interlock with the base structure to provide structural support to the enclosure and/or to provide various toolless port configurations. Port plates similar to those discussed above, but sized to interface with port openings 912, can be used to install various port configurations. The port plates may also include port couplers that similarly interlock with the port openings of multiple base structures to create larger enclosure systems by stacking base structures (as shown in FIG. 11).

As with base structure 202, base structure 902 also includes groove 916 for receiving a respective tongue of a door cover. In some examples, alternatively, base structure 902 may include the tongue and the cover may include the corresponding groove.

As with previously described embodiments, toolless modular and/or integrated mounting features allow the enclosure to be configured in the factory or in the field to fit a specific mounting application, such as surface mount or in-wall installations. For example, mounting tabs 908 included on base panel sides 905 and 907 can be snap fit or integrally formed, for securing base structure to a wall, by receiving a fastener inserted therethrough, when the base structure is inserted into a hollow in the wall or between studs or other support structures.

Figure 10B:
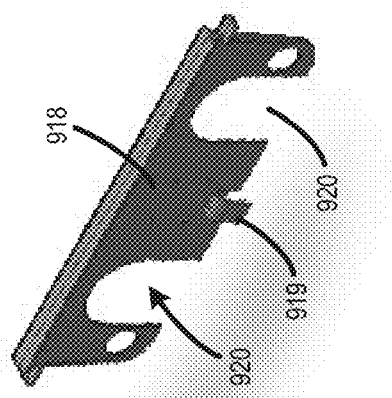
FIGS. 10A, 10B and 10C illustrate perspective views of a coupler plate and a coupler plate insert configured to couple two base structures, such as illustrated in FIGS. 9A and 9B, to form a larger enclosure, and configured to divide a base structure cavity into the separate sub-cavities.

Port openings 912 include a tongue 912a to receive a corresponding groove (see e.g., grooves 927 and 937 shown in FIGS. 10D and 10E) of a port insert (see e.g., port inserts 925 and 935). Port inserts 925 and 935 provide ports at the ends of an enclosure similar to those discussed above, but using a single port insert to provide two ports.

Figure 10A:
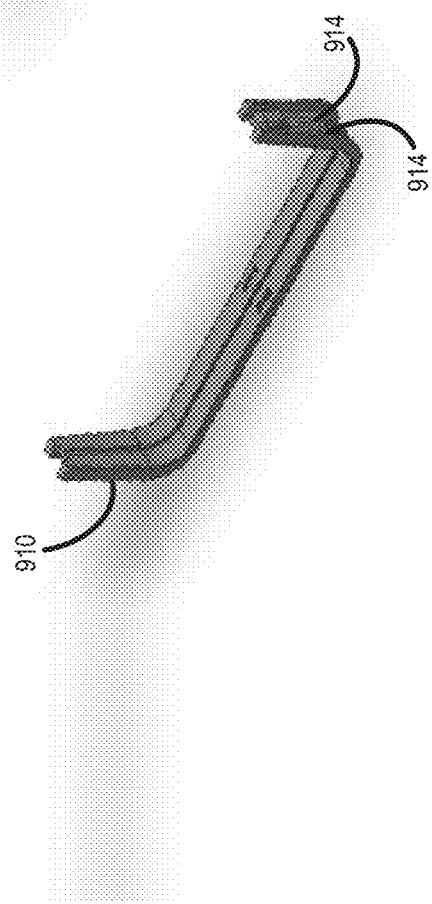
Figure 10C:
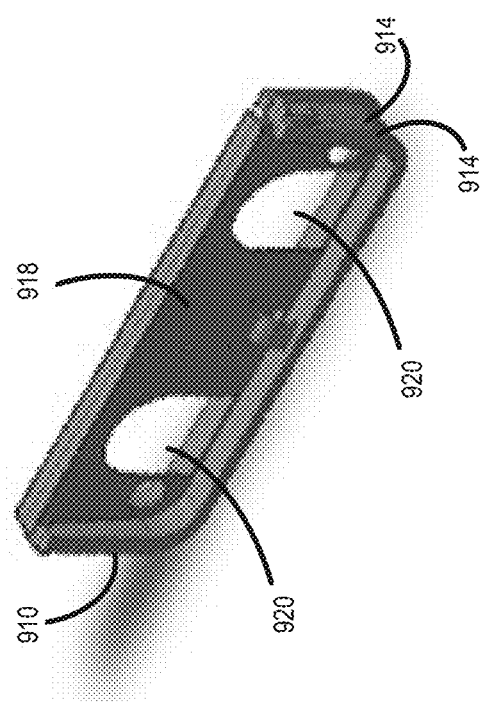

Coupler plate 910 shown in FIG. 10A, which is used to couple two base structures 902 together to form a larger enclosure, also includes a dual set of grooves 914 to receive tongues 912a of the two adjacently positioned base structures. Also, beside each port 912 is a pair of opposing latch parts 912b that correspond to latch parts of a port insert. Tongue 912a and a corresponding groove on an insert guide the insert into port 912. Latch parts 912b can couple corresponding latch parts of a port insert to lock the insert into place in port 912. A receiving hollow or snap fit part 913 beside each port 912 is configured to receive a latch part 919 of a coupler plate insert 918 (shown in FIG. 10B) which cooperates with a coupler plate 910 to provide ports between two coupled base structures 902 in a larger enclosure configuration. The combined coupler plate 910 and coupler plate insert 918 is shown in FIG. 10C.

Figure 9B:
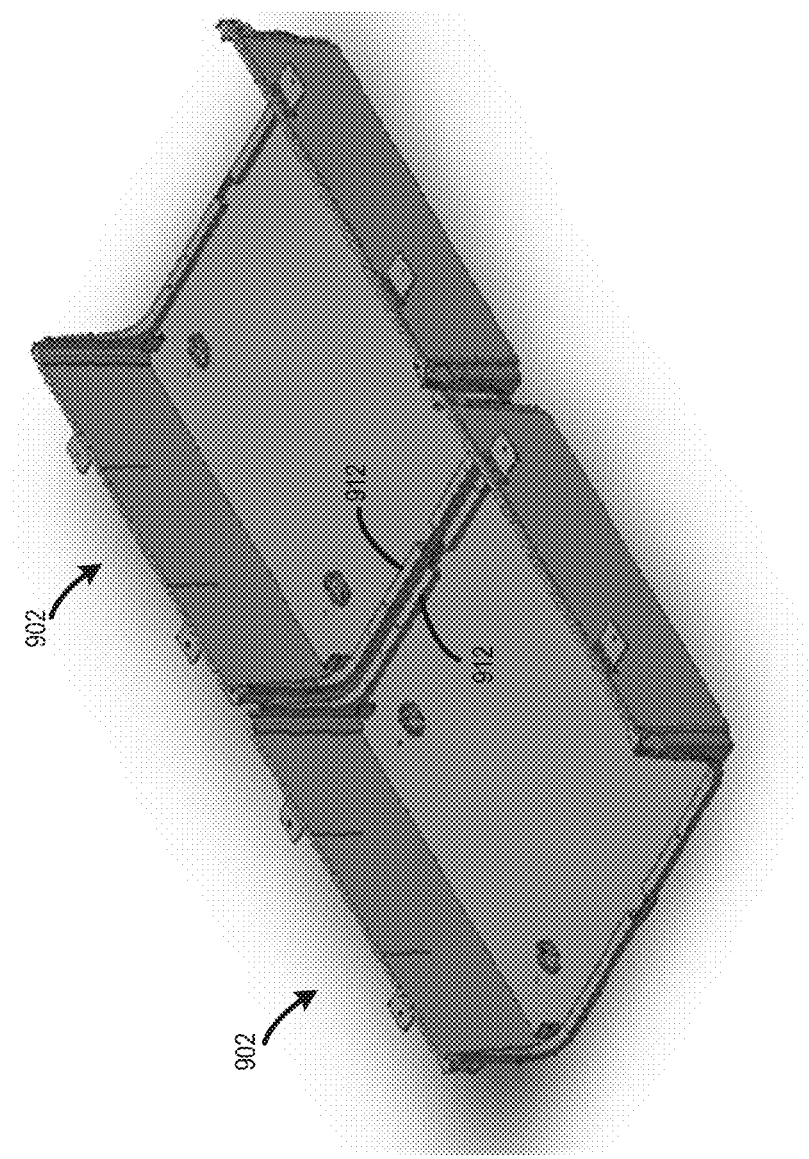

As discussed, to configure a larger enclosure, two base structures 902 can be placed adjacent one another with a respective port 912 from each aligned. See for example, FIG. 9B. A couple plate 910 can then be inserted into the adjacent ports 912, with the grooves 914 of the coupler plate each receiving the tongue 912a of one of the ports. The resulting configuration can be seen in the enclosure configuration shown in FIG. 11. To provide ports between the cavities of the two adjoined base structures, a coupler plate insert 918 can be inserted into coupler plate 910, with latch a latch part 919 inserted into one of corresponding hollows 913 to secure the coupler plate insert to the coupler plate. Coupler plate insert 918 includes one or more sub-ports 920 between the two base structures 902. This configuration is also shown in FIG. 11.

Referring again to FIGS. 10D and 10E, port inserts 925 and 935, which illustrate two example port insert configurations, are shown to include sub-ports having different shapes or sizes. Port insert 925 is shown providing one round sub-port 928 and one rectangular sub-port 930. Correspondingly shaped sub-plates 929 and 931 are shown inserted into sub-ports 928 and 930, but can be removed or knocked out to provide the particular desired port configuration of the enclosure. Port insert 935 is shown providing an alternate configuration of two round sub-ports 928 with corresponding round sub-plates 929 which can be removed as desired. Referring again to FIG. 11 the illustrated enclosure configuration is shown with one each of port inserts 925 and 935 attached to port openings 912 at different ends of the enclosure. As discussed above, the attachment is accomplished by inserting the port inserts into the port openings with tongue 912a of each port opening being received by the corresponding groove 927 and 937 of the port inserts.

Also shown in FIG. 11 is a component mounting surface component 906 inserted into the cavity 904 of each base structure 902 of the enclosure. Component mounting surface components 906 can be substantially the same as component mounting surface components 206 described above, for example providing one or more component mounting patterns for mounting components within the enclosure.

Figure 12A:
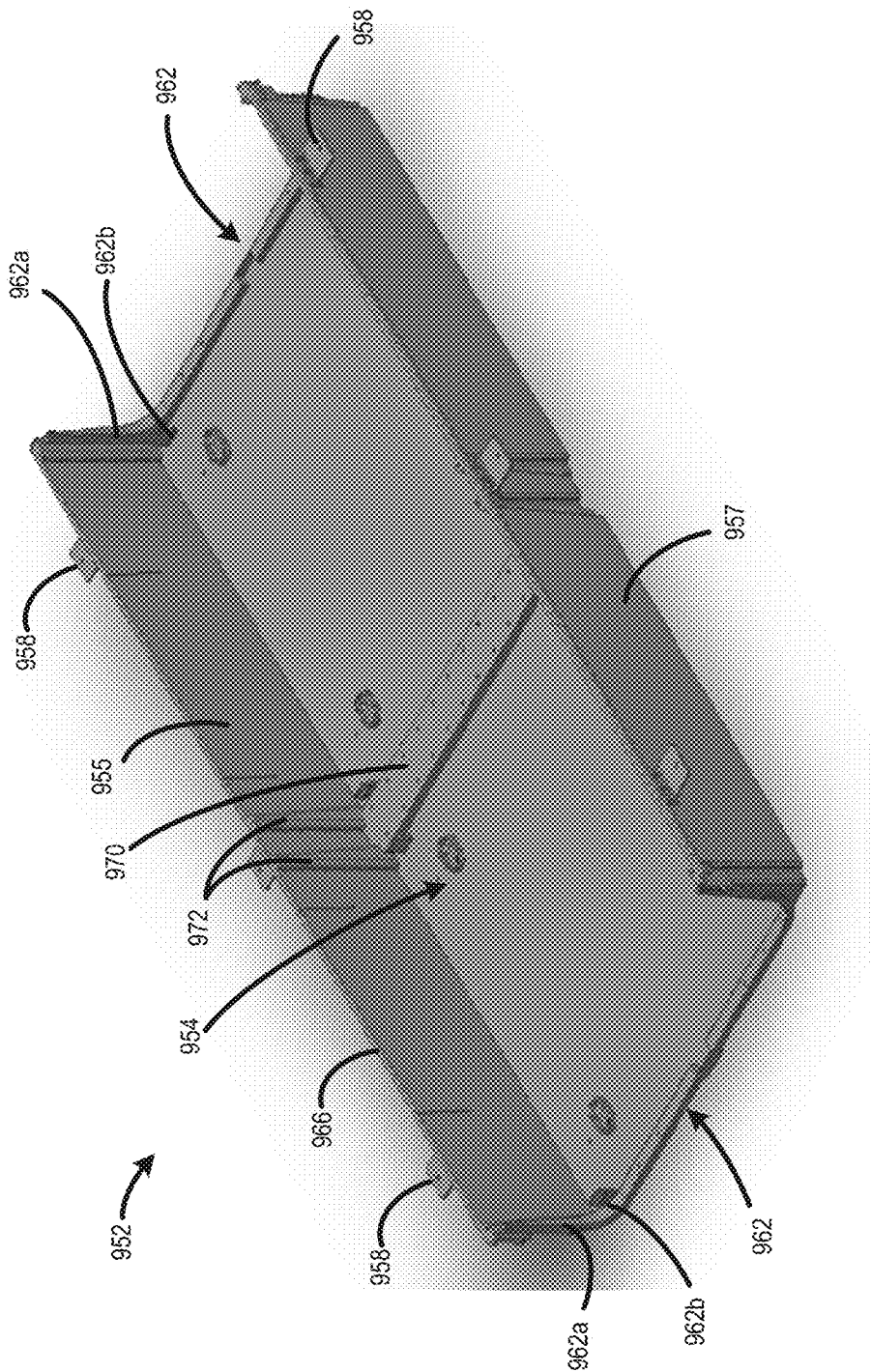
FIG. 12A illustrates a perspective view of yet another example base structure of the modular enclosure system.

Referring now to FIG. 12A, shown is yet another alternate enclosure base structure 952 in accordance with disclosed embodiments. Base structure 952 is similar in respects to base structures 202 and 902, and has similar features to those discussed above. However, base structure 952 provides an enclosure the size of two individual base structures such as base structures 202 and 902. As shown in FIG. 12A, the base structure 952 may include similar modular aspect to those discussed above, including one or more base panels with one or more identical port openings. For example, the base structure 952 includes base panel sides 955 and 957 which partially form a cavity 954. At the remaining two sides of base structure 952, two port openings 962 are provided which are identical in structure. Port openings 962 may accept a variety of port plates which interlock with the base structure to provide structural support to the enclosure and/or to provide various toolless port configurations. In exemplary embodiments, port openings 962 are configured similar to or the same as port openings 912 discussed above such that port openings 962 can accept the same port plates (e.g., port plates 925 and 935) as port openings 912 of base structure 902.

As with base structure 202 and 902, base structure 952 also includes groove 966 for receiving a respective tongue of a door cover. In some examples, alternatively, base structure 952 may include the tongue and the cover may include the corresponding groove.

As with previously described embodiments, toolless modular and/or integrated mounting features allow the enclosure to be configured in the factory or in the field to fit a specific mounting application, such as surface mount or in-wall installations. For example, mounting tabs 958 included on base panel sides 955 and 957 can be snap fit or integrally formed, for securing base structure to a wall, by receiving a fastener inserted therethrough, when the base structure is inserted into a hollow in the wall or between studs or other support structures.

Configured the same as port openings 912, port openings 962 include a tongue 962a to receive a corresponding groove (see e.g., grooves 927 and 937 shown in FIGS. 10D and 10E) of a port insert (see e.g., port inserts 925 and 935). Also, beside each port 962 is a pair of opposing latch parts 962b that correspond to latch parts of a port insert. Tongue 962a and a corresponding groove on an insert guide the insert into port 962. Latch parts 962b can couple corresponding latch parts of a port insert to lock the insert into place in port 962.

Base structure 952 includes a raised midsection 970 extending laterally between base panel sides 955 and 957. Abutting raised midsection 970, on an interior of the enclosure each of base panel sides 955 and 957 include tongues 972 spaced apart and configured to mate with grooves of a midsection insert plate. In exemplary embodiments, coupler plate 910 discussed above for use in joining two base structures 902 can also be used to create two sub cavities in single base structure 952, with grooves 914 of coupler plate 910 receiving tongues 972 of base panel sides 955 and 957 (see e.g., FIG. 12D having coupler plate 910 and coupler plate insert 918 creating a divided cavity within base structure 952.

Figure 12B:
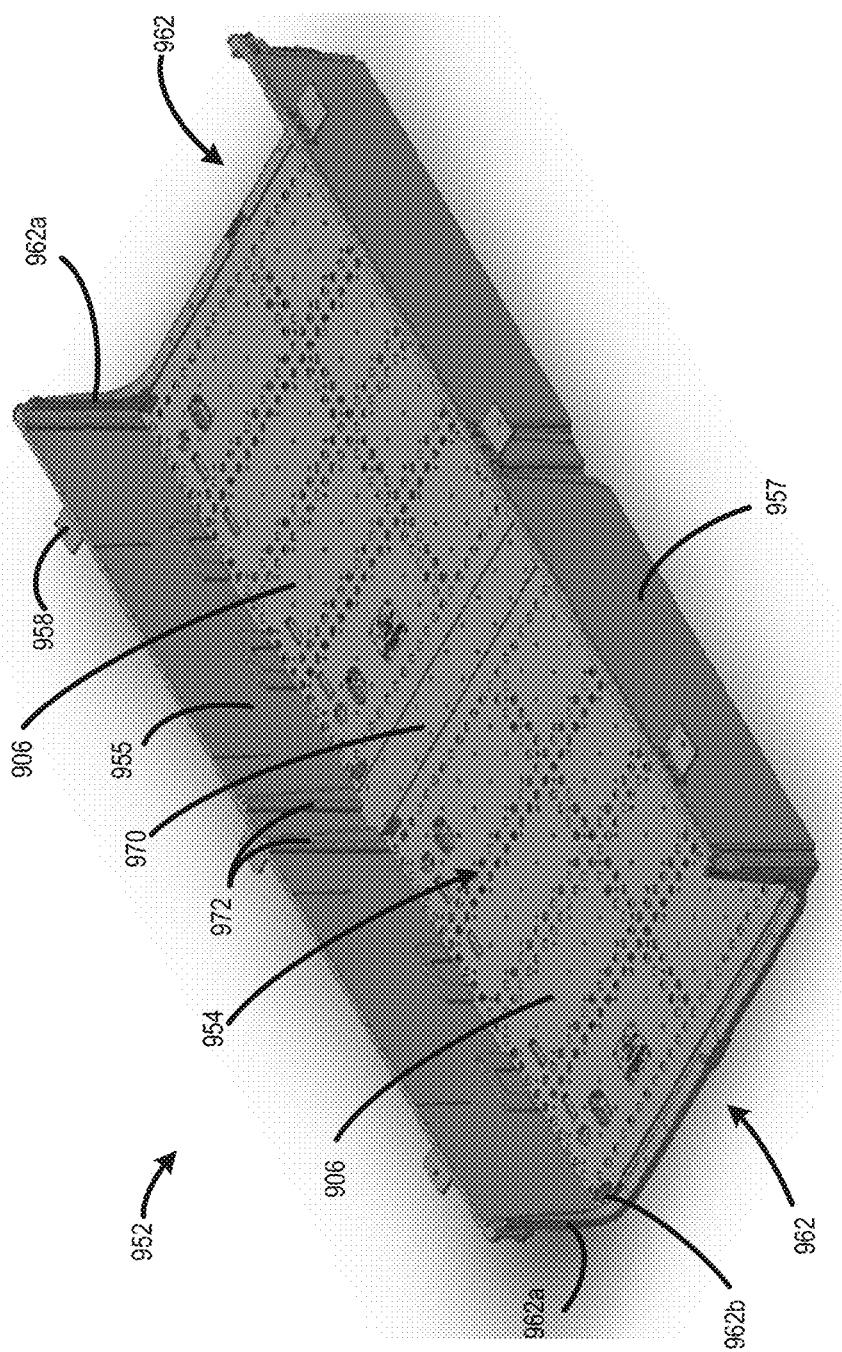
FIGS. 12B, 12C and 12D illustrate perspective views of various stages of a modular enclosure system using the example base structure illustrated in FIG. 12A.
Figure 12C:
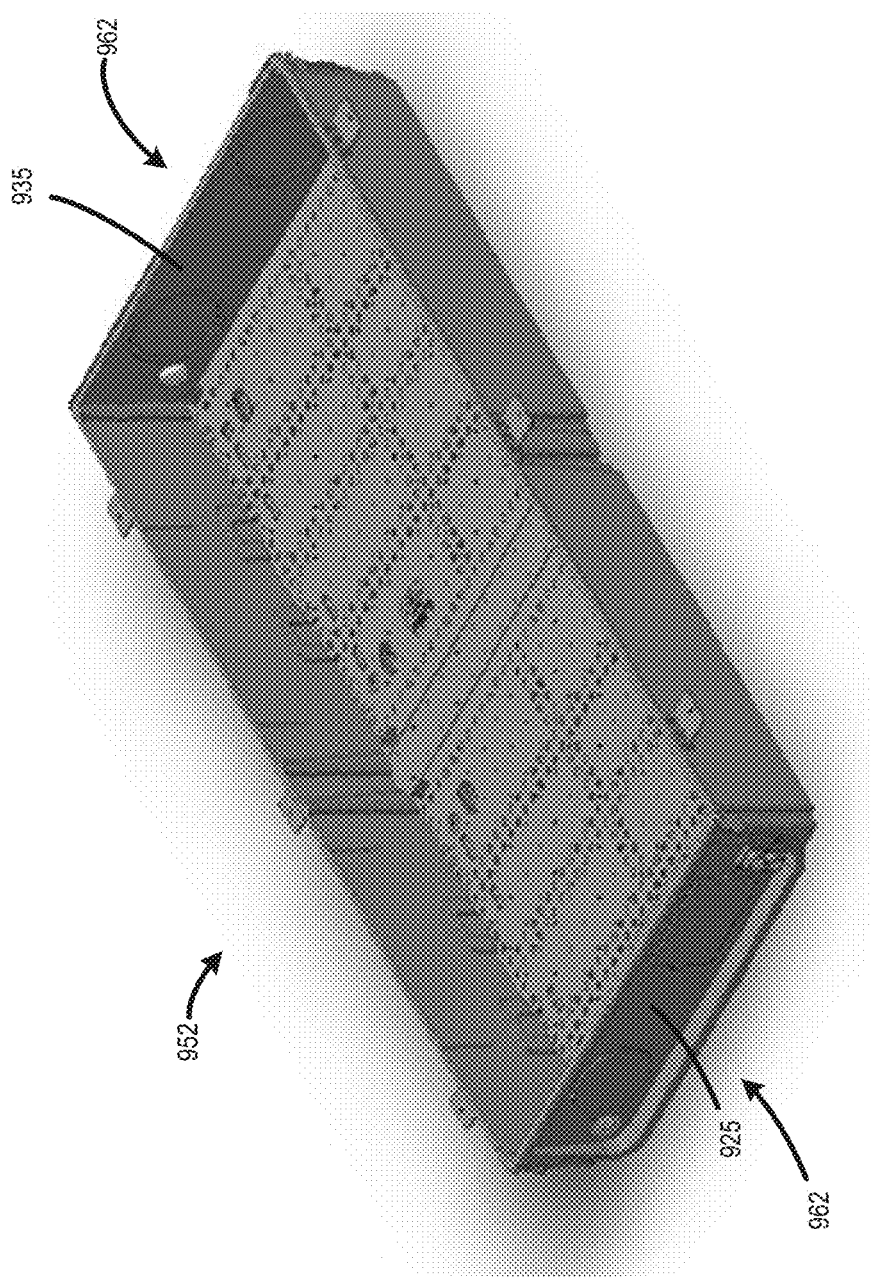
Figure 12D:
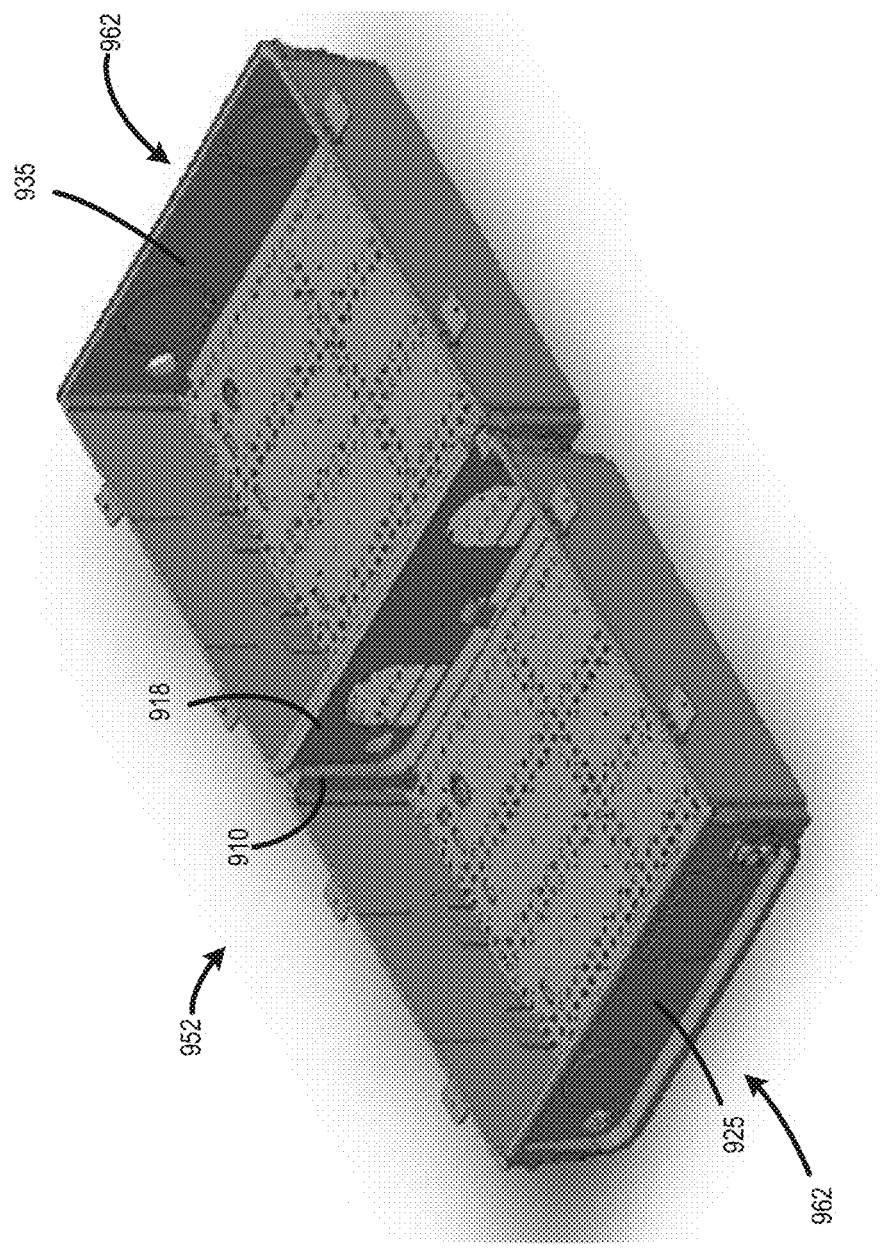

FIGS. 12B-12D illustrate base structure 952 with various other modular components to configure the enclosure. For example, FIG. 12B illustrates base structure 952 with a pair of component mounting surfaces 906 inserted into the cavity 954 of the base structure 952 of the enclosure on either side of raised midsection 970. FIG. 12C illustrates base structure 952 also with port inserts 925 and 935 attached to the ports 962 of the base structure 952 using the insert grooves and port tongues as described above. FIG. 12D illustrates base structure 952 further having coupler plate 910 and coupler plate insert 918 dividing the cavity of the base structure into two sub-cavities.

Figure 13:
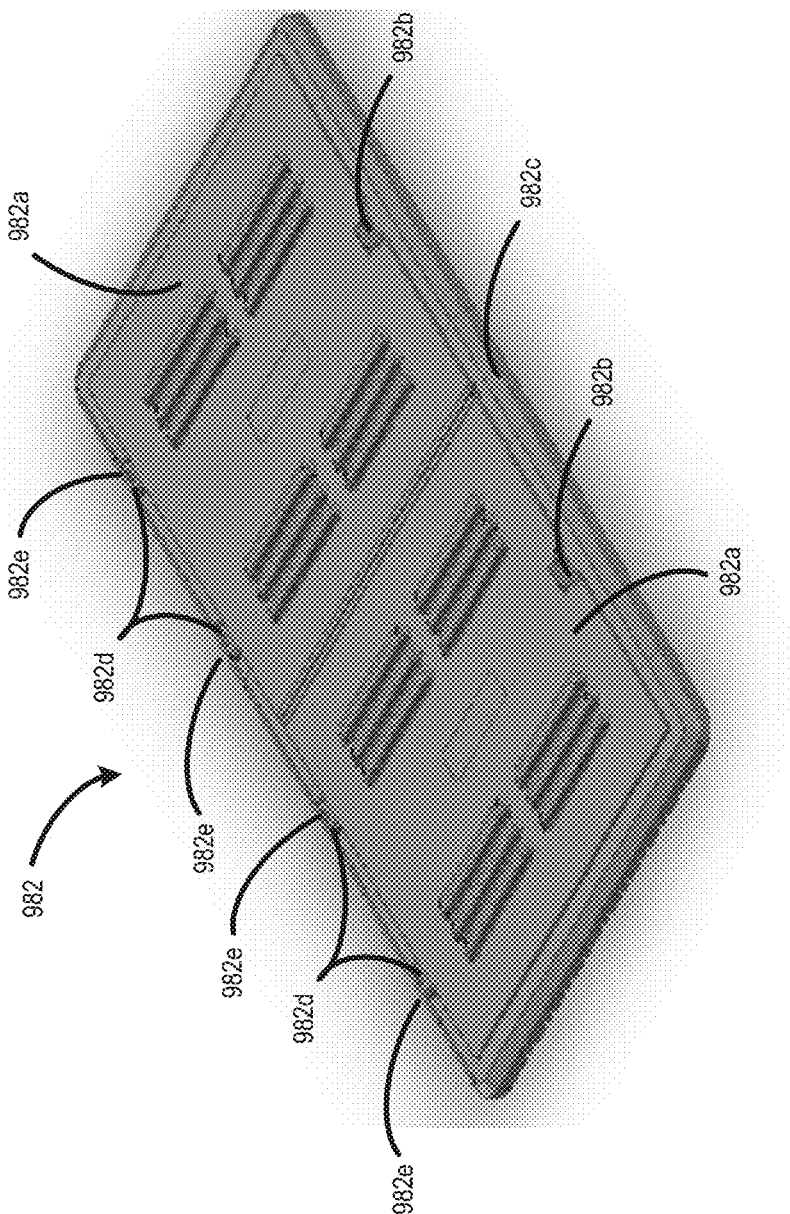
FIG. 13 illustrates a perspective view of an optional cover that can attach to the example base structures of FIGS. 9B and 12A.

As was the case with previous embodiments, base section 952 or a combination of two base sections 902 can be configured to attach a modular door cover such as the cover 982 shown in FIG. 13. Cover 982 includes a pair of doors 982*a*, each having a latch 982*b*, door frame 982*c*, and hinges 982*d*. Doors 982*a* includes door hinge parts 982*e* which are shown connected to hinges 982*d*. Hinges 982*d* are shown connected to door frame 982*c*. Doors 982*a* also include latches 982*b* that can latch to a cover latch loop (see e.g., cover latch loop 408*a* discussed above) or other latch receiving components when the door is closed against the base structure 902 or 952.

Although the present invention has been described with reference to preferred embodiments, workers skilled in the art will recognize that changes may be made in form and detail without departing from the spirit and scope of the invention.

What is claimed is:

1. A modular stackable electrical enclosure system, comprising:
   at least one base structure, each base structure including:
      a cavity structure providing a cavity, the cavity structure having a base structure sealing groove around a perimeter of the cavity and including a component mounting surface with a component mounting pattern, the component mounting pattern including a plurality of component mounting holes configured to receive a plurality of corresponding component mounting fasteners; and
      a plurality of modular ports configured to provide openings to the cavity, each of the plurality of modular ports having a port tongue attachment structure, wherein the base structure sealing groove of the cavity structure is broken at each of the plurality of modular ports; and
   a plurality of interchangeable port plates, each of the plurality of interchangeable port plates having a plate groove attachment structure configured to receive the port tongue attachment structure of a corresponding one of the plurality of modular ports to attach the interchangeable port plate to the corresponding one of the plurality of modular ports, and wherein each of the plurality of interchangeable port plates includes a port plate sealing groove configured such that when the interchangeable port plate is attached to the corresponding one of the plurality of modular ports, the port plate sealing groove forms a combined sealing groove with the base structure sealing groove.

2. The modular stackable electrical enclosure system of claim 1, wherein the at least one base structure comprises two base structures, and wherein the plurality of interchangeable port plates comprises at least one stacking coupler plate with a plate groove attachment structure including first and second grooves, with each of the first and second grooves being configured to receive the port tongue attachment structure of a modular port of a different one of the two base structures to thereby secure the two base structures together with modular ports of the two base structures aligned and positioned adjacent one another, and wherein each of the at least one stacking coupler plate includes two port plate sealing grooves configured such that when the two base structures are secured together with the modular ports of the two base structures aligned and positioned adjacent one another, each of the two port plate sealing grooves forms a combined sealing groove with a different one of the base structures.

3. The modular stackable electrical enclosure system of clam 2, wherein the at least one stacking coupler plate comprises first and second stacking coupler plates each with the plate groove attachment structure including first and second grooves configured to receive the port tongue attachment structure of modular ports of the two base structures to thereby secure the two base structures together.

4. The modular stackable electrical enclosure system of claim 3, wherein each of the first and second stacking coupler plates provides a sub-port configured to receive smaller port plate which is smaller than the plurality of interchangeable port plates.

5. The modular stackable electrical enclosure system of claim 3, and further comprising at least one cover configured to attach to the two base structures such that the at least one cover is moveable to cover or expose the cavity of each of the two base structures, the at least one cover having a tongue configured to interface with the sealing grooves of the two base structures and the port plate sealing grooves to form a sealed enclosure.

6. The modular stackable electrical enclosure system of claim 2, wherein the component mounting pattern includes a plurality of component mounting sub-patterns each including respective component mounting holes arranged in respective grids.

7. The modular stackable electrical enclosure system of claim 2, wherein for each base structure, the plurality of modular ports comprise two modular ports on each of two opposite ends of the cavity structure.

8. The modular stackable electrical enclosure system of claim 2, wherein for each base structure, the plurality of modular ports comprise one modular port on each of two opposite ends of the cavity structure.

9. The modular stackable electrical enclosure system of claim 8, and further comprising a coupler plate insert configured to be inserted into the stacking coupler plate.

10. The modular stackable electrical enclosure system of claim 9, wherein the coupler plate insert provides at least one sub-port between the two base structures.

11. The modular stackable electrical enclosure system of claim 2, wherein each base structure includes at least one port latch part positioned adjacent each of the plurality of modular ports, and wherein each of the plurality of interchangeable port plates includes at least one plate latch part configured to interface with a corresponding port latch part to lock the interchangeable port plate into place in the corresponding modular port.

12. The modular stackable electrical enclosure system of claim 1, and further comprising a plurality of accessory mount interfaces, configured to receive a plurality of corresponding toolless-attachable accessory mounts, the toolless-attachable accessory mounts including at least one from the group of: a surface mount, a flush mount, a cover hinge mount, a cover latch mount and a cover screw boss mount, wherein the plurality of accessory mount interfaces include a plurality of accessory mount interface apertures.

13. The modular stackable electrical enclosure system of claim 12, wherein the plurality of accessory mount interface apertures include a plurality of cover mounting apertures.

14. The modular stackable electrical enclosure system of claim 1, wherein when the interchangeable port plate is attached to the corresponding one of the plurality of modular ports, the combined sealing groove formed between the port plate sealing groove and the base structure sealing groove is substantially seamless.

\* \* \* \* \*